United States Patent [19]

Muto et al.

[11] Patent Number: 4,951,281

[45] Date of Patent: Aug. 21, 1990

[54] MULTIPLEX TRANSMISSION SYSTEM

[75] Inventors: Makoto Muto; Kyosuke Hasimoto; Yutaka Matsuda, all of Hiratsuka; Yusaku Himono, Tokyo; Kiyoshi Inoue, Hiratsuka; Teruhisa Inoue, Ichikawa; Osamu Michihira; Yuichi Ito, both of Hiroshima, all of Japan

[73] Assignees: Furukawa Electric Co., Ltd., Tokyo; Mazda Motor Corp., Hiroshima, both of Japan

[21] Appl. No.: 277,060

[22] Filed: Nov. 28, 1988

[30] Foreign Application Priority Data

| Nov. 30, 1987 | [JP] | Japan | 62-302421 |
| Nov. 30, 1987 | [JP] | Japan | 62-302427 |
| Aug. 8, 1988 | [JP] | Japan | 63-197601 |
| Aug. 8, 1988 | [JP] | Japan | 63-197602 |

[51] Int. Cl.$^5$ .................................................. H04J 3/00
[52] U.S. Cl. ................................. 370/95.2; 370/85.8; 370/94.1
[58] Field of Search ............... 370/94.2, 94.1, 85.3, 370/85.8, 95.2; 340/825.5, 825.51, 825.08

[56] References Cited

U.S. PATENT DOCUMENTS

| 4,149,144 | 4/1979 | Diefenderfer | 370/85.8 |
| 4,519,068 | 5/1985 | Krebs et al. | 370/94.2 |
| 4,689,785 | 8/1987 | Toyonaga et al. | 370/85.3 |
| 4,736,367 | 4/1988 | Wroblewski et al. | 370/85.8 |
| 4,736,371 | 4/1988 | Tejima et al. | 370/94.1 |

Primary Examiner—Douglas W. Olms
Assistant Examiner—Christopher O. Edwards
Attorney, Agent, or Firm—Frishauf, Holtz, Goodman & Woodward

[57] ABSTRACT

A multiplex transmission system, in which a node as a transmission node transmits data frame by frame to a transmission path, and a plurality of other nodes, as reception nodes, returns a reception acknowledgment signal to the transmission path upon proper reception of the frame of data. Each of the reception nodes which properly received the frame returns the reception acknowledgment signal specific thereto to that division of a reception acknowledgment signal area in the frame which corresponds to this node. Each node discriminates the success/failure of signal transmission, by comparing the information registered beforehand in its reception acknowledgment signal table with the information in the reception acknowledgment signal area. When the information of the reception acknowledgment signal table does not coincide with that of the reception acknowledgment signal area, the transmission node re-transmits the frame and the reception acknowledgment signal tables of all the nodes are updated. The system can not only effect the addition and deletion of multiplex nodes easily without requiring the change of scale of the circuit of the system, but also discriminate trouble for each of the multiplex nodes.

15 Claims, 26 Drawing Sheets

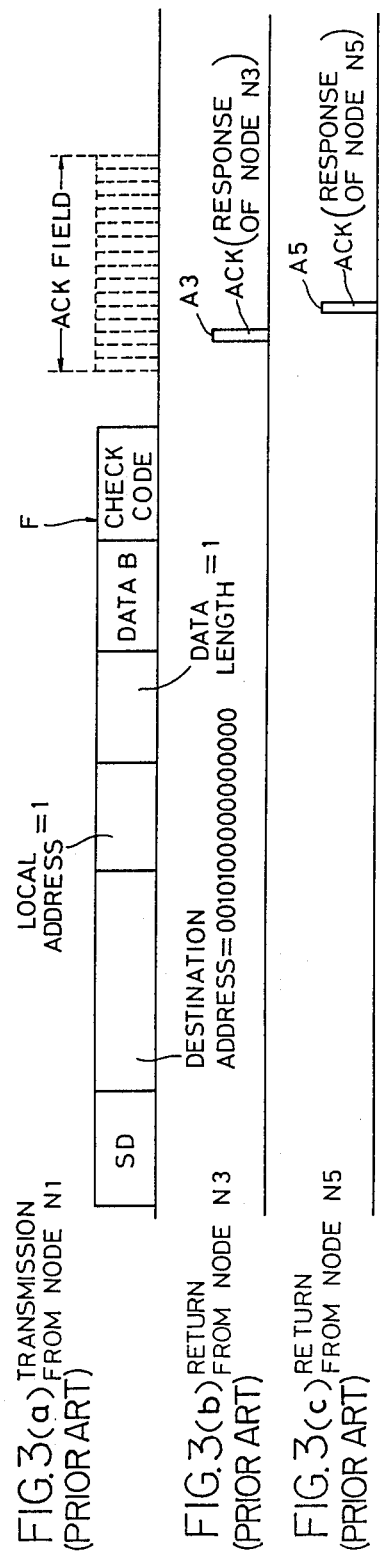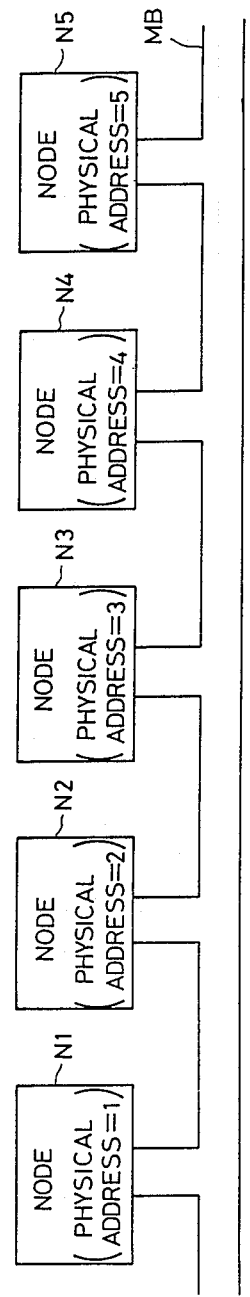
FIG. 4.
(PRIOR ART)

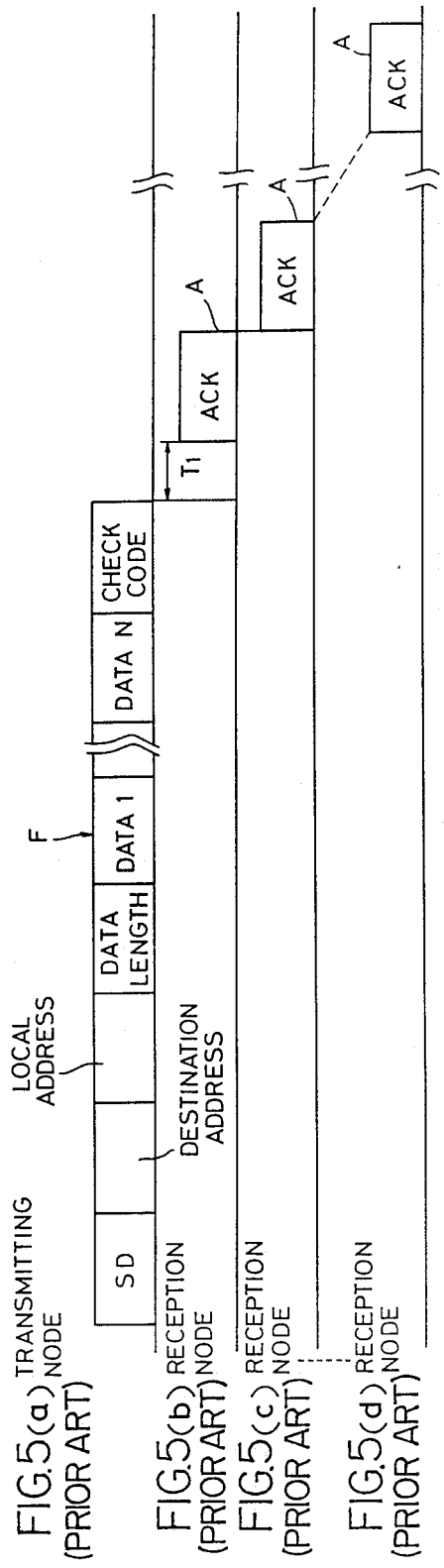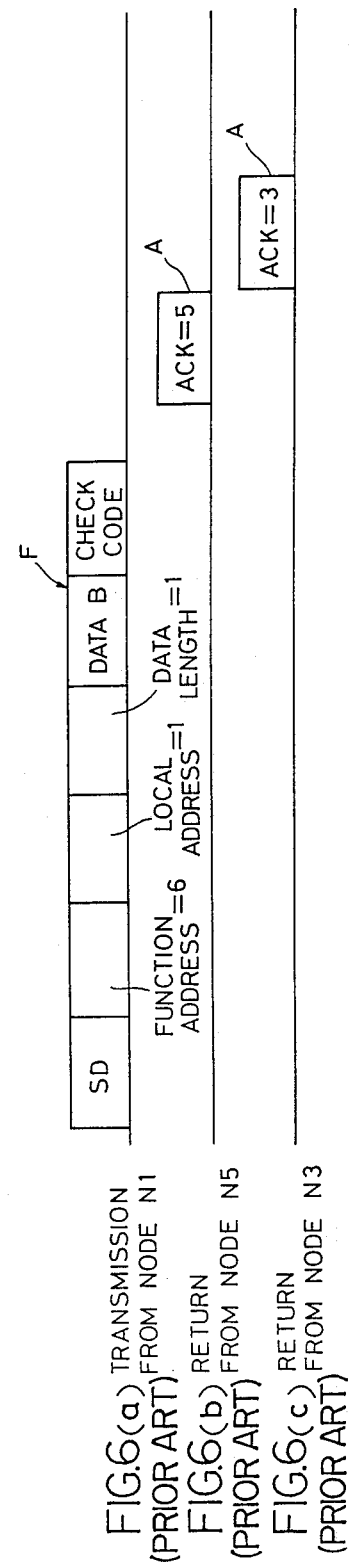

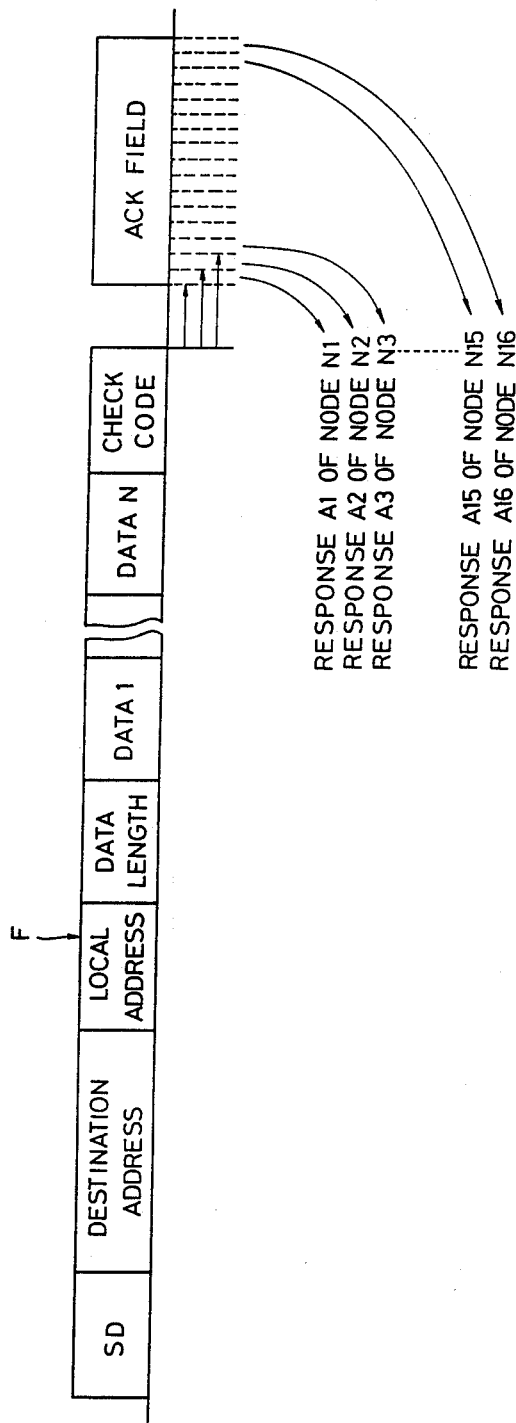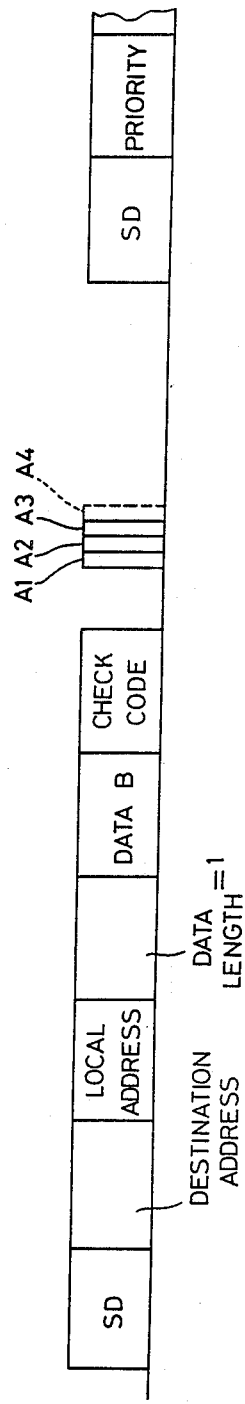

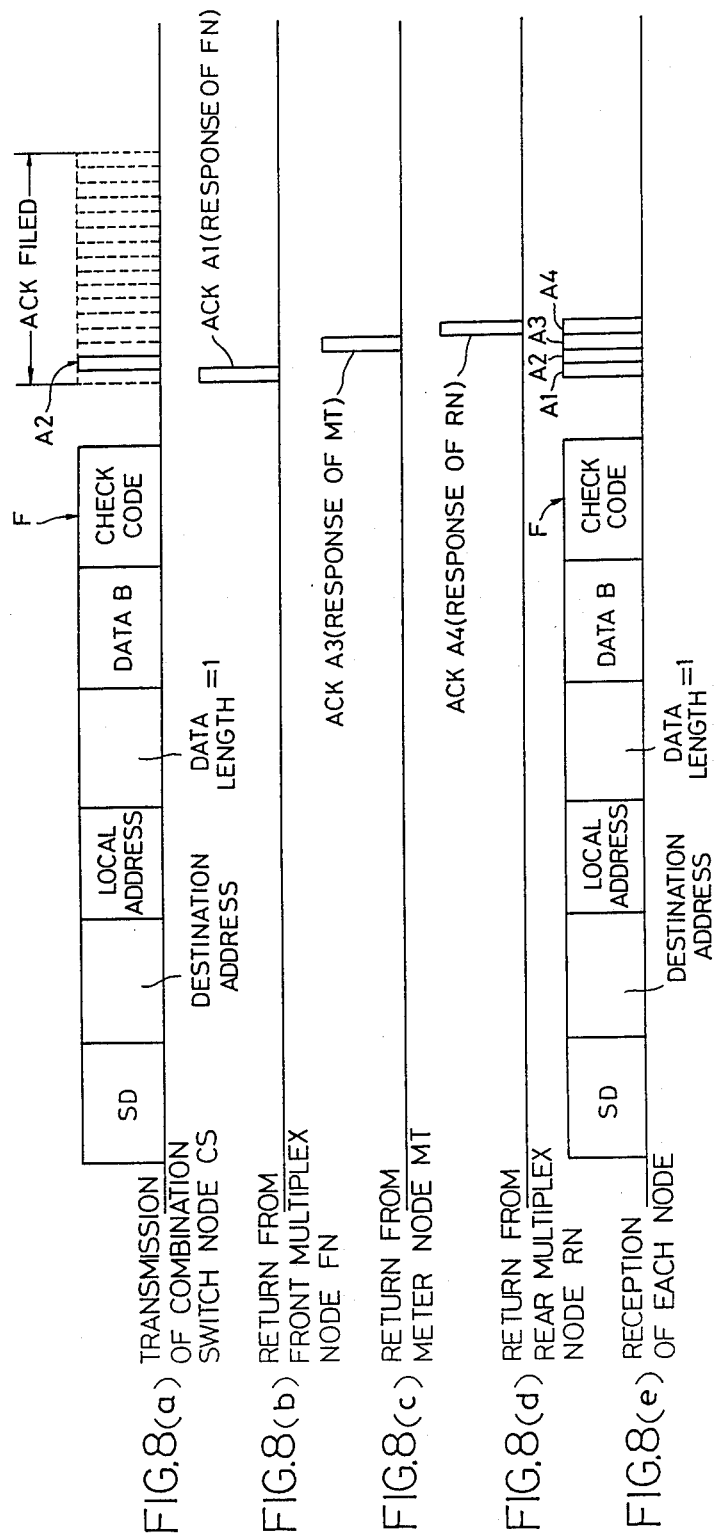

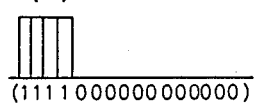
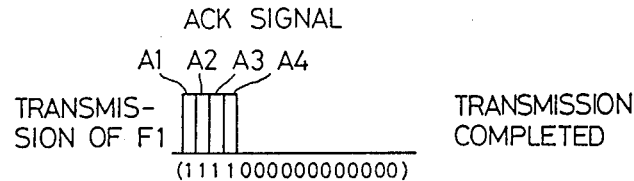
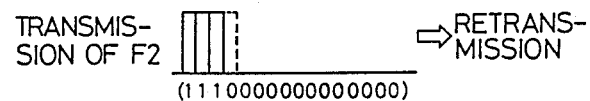
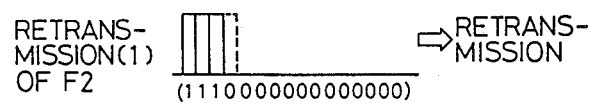
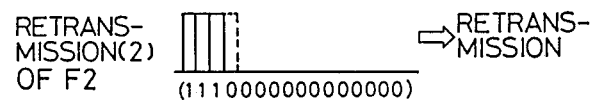
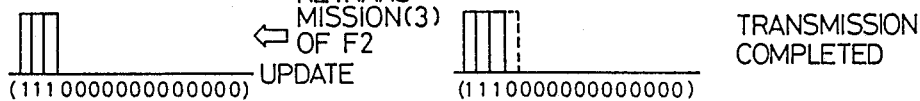
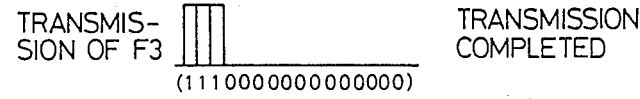

ACK TABLE           ACK SIGNAL
FIG. 11(a) 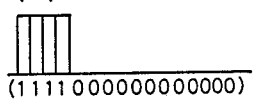 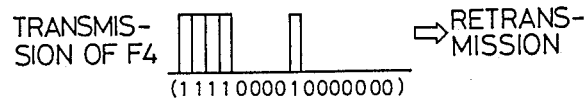
TRANSMISSION OF F4 ⇒ RETRANSMISSION

RETRANSMISSION(1) OF F4 ⇒ RETRANSMISSION

RETRANSMISSION(2) OF F4 ⇒ RETRANSMISSION

RETRANSMISSION(3) OF F4    TRANSMISSION COMPLETED

TRANSMISSION OF F5    TRANSMISSION COMPLETED

ACK TABLE    ACK SIGNAL
FIG.12(a) 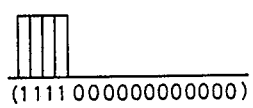 TRANSMISSION OF F7 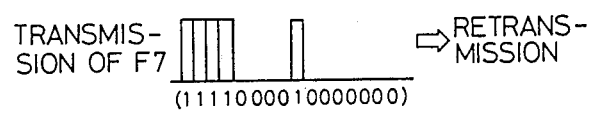 ⇒ RETRANSMISSION
FIG.12(b) RETRANSMISSION(1) OF F7 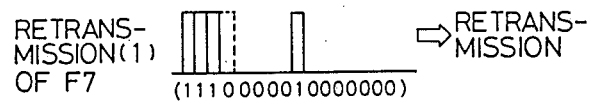 ⇒ RETRANSMISSION
FIG.12(c) RETRANSMISSION(2) OF F7 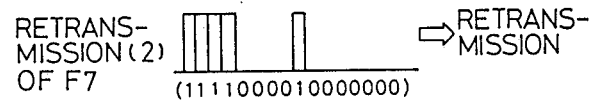 ⇒ RETRANSMISSION
  ⇐ RETRANSMISSION(3) OF F7 — UPDATE     TRANSMISSION COMPLETED
FIG.12(e) TRANSMISSION OF F8 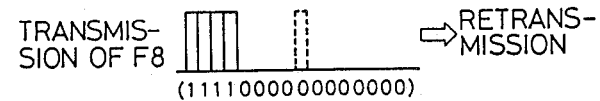 ⇒ RETRANSMISSION

RETRANS-
MISSION (1)
OF F8
(1111000010000000)
TRANSMISSION
COMPLETED

TRANSMIS-
SION OF F9
(1111000010000000)
TRANSMISSION
COMPLETED

TRANSMIS-
SION OF F10
(1110000010000000)
⇒ RETRANS-
MISSION

RETRANS-
MISSION (1)
OF F10
(1111000010000000)
TRANSMISSION
COMPLETED

RESPONSE OF NODE FN
RESPONSE OF NODE CS
RESPONSE OF NODE MT
RESPONSE OF NODE RN

RESPONSE OF NODE RN2

ACK TABLE  ACK SIGNAL

TRANSMISSION OF F11 ⇒ RETRANSMISSION
(1111000000000000) (1111000010000000)

RETRANSMISSION(1) OF F11 ⇒ RETRANSMISSION
(1110000010000000)

RETRANSMISSION(2) OF F11 ⇒ RETRANSMISSION
(1110000010000000)

⇐ RETRANSMISSION(3) OF F11 — UPDATE TRANSMISSION COMPLETED
(1111000010000000) (1110000010000000)

⇐ TRANSMISSION OF F12 — UPDATE ⇒ RETRANSMISSION
(1110000010000000) (1110000000000000)

RETRANSMISSION(1) OF F12  (1110000000000000) ⇒ RETRANSMISSION

RETRANSMISSION(2) OF F12  (1110000010000000) ⇒ RETRANSMISSION

RETRANSMISSION(3) OF F12  (1111000010000000)  TRANSMISSION COMPLETED

TRANSMISSION OF 13  (1111000010000000)  TRANSMISSION COMPLETED

RESPONSE OF NODE FN
RESPONSE OF NODE CS
RESPONSE OF NODE MT
RESPONSE OF NODE RN

RESPONSE OF NODE RN2

ACK TABLE          ACK SIGNAL
FIG. 14(a) 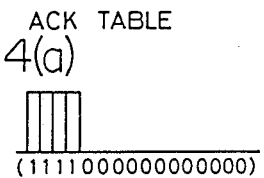 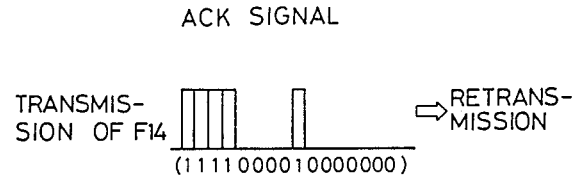
TRANSMISSION OF F14 ⇒ RETRANSMISSION
(1111000000000000)    (1111000010000000)

RETRANSMISSION(1) OF F14 ⇒ RETRANSMISSION
(1110000010000000)

RETRANSMISSION(2) OF F14 ⇒ RETRANSMISSION
(1110000010000000)

⇐ RETRANSMISSION(3) OF F14 UPDATE    TRANSMISSION COMPLETED
(1111000010000000)    (1110000010000000)

TRANSMISSION OF F15 ⇒ RETRANSMISSION
(1110000000000000)

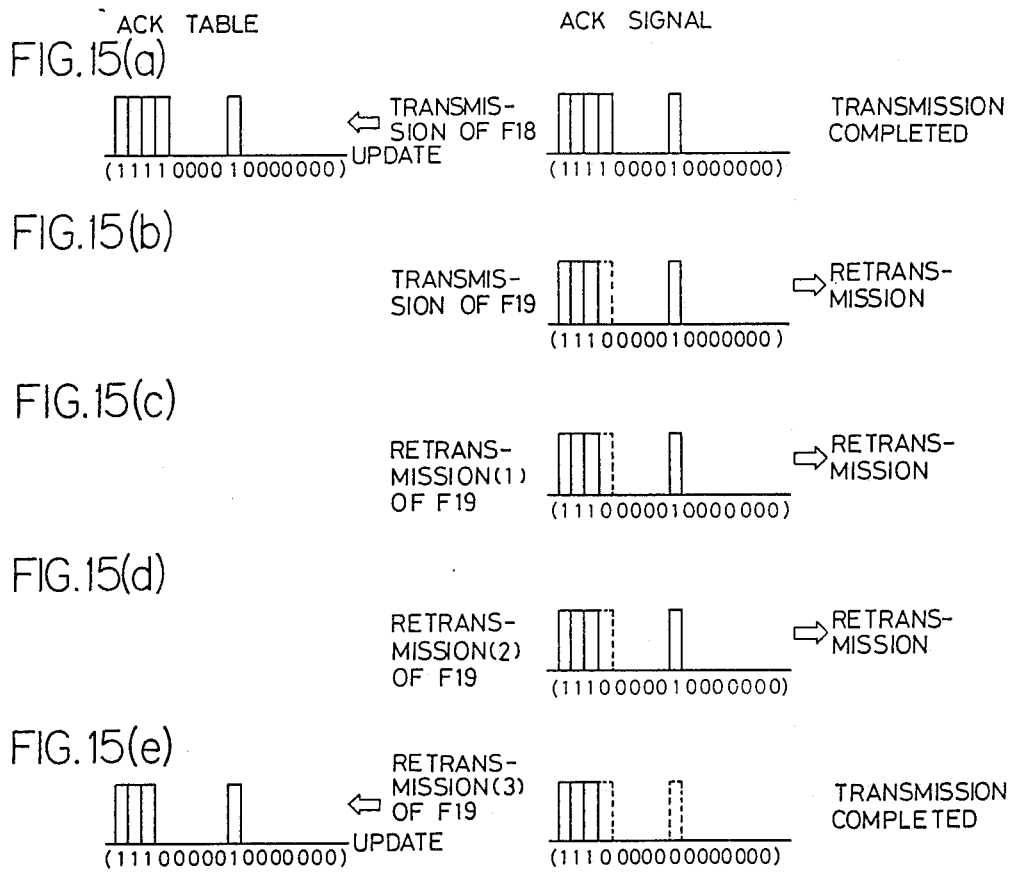

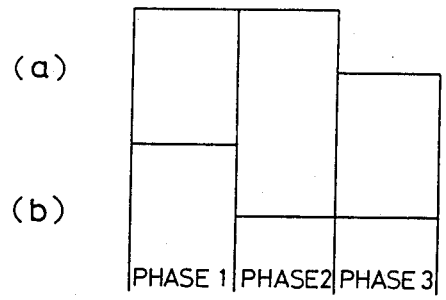
FIG.17
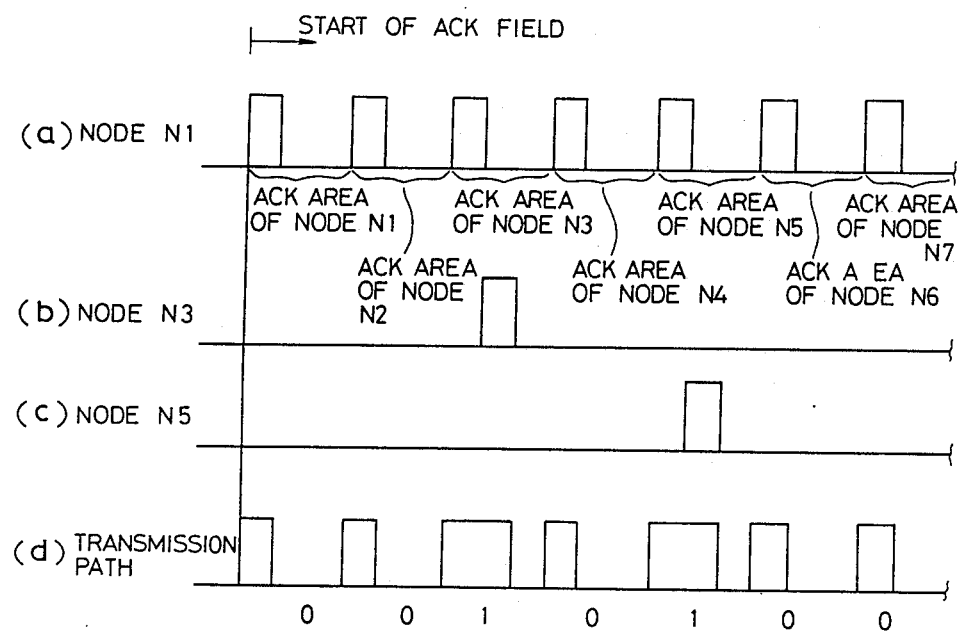

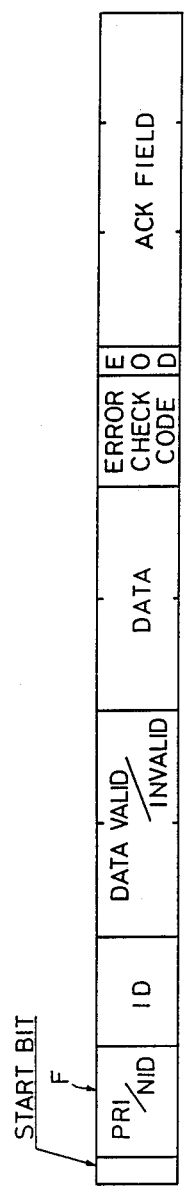
FIG. 23
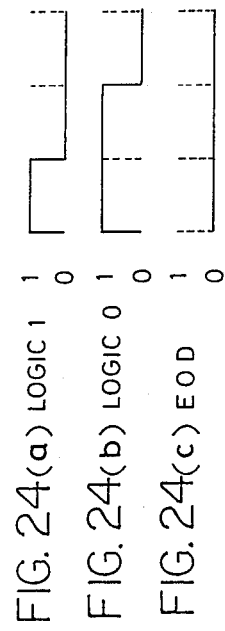
FIG. 24(a) LOGIC 1
FIG. 24(b) LOGIC 0
FIG. 24(c) EOD ACK TABLE    ACK SIGNAL
FIG. 25(a)
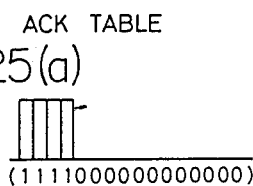
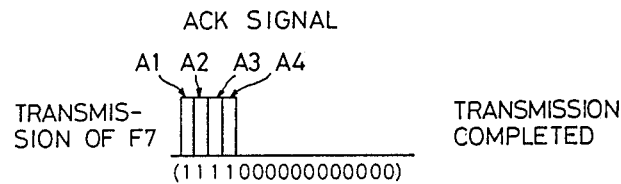
A1 A2 A3 A4
TRANSMISSION OF F7    TRANSMISSION COMPLETED
(1111000000000000)    (1111000000000000)
FIG. 25(b)
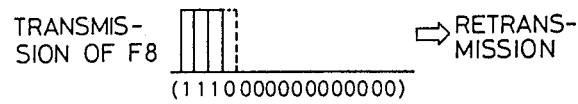
TRANSMISSION OF F8    ⇒ RETRANSMISSION
(1110000000000000)
FIG. 25(c)
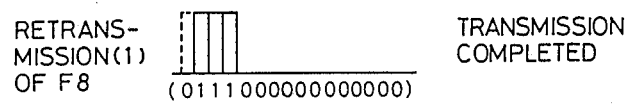
RETRANSMISSION(1) OF F8    TRANSMISSION COMPLETED
(0111000000000000)
FIG. 25(d)
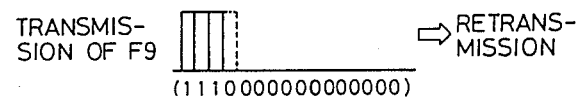
TRANSMISSION OF F9    ⇒ RETRANSMISSION
(1110000000000000)
FIG. 25(e)
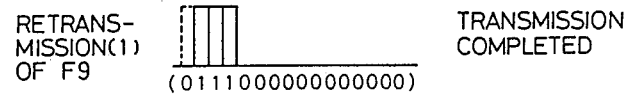
RETRANSMISSION(1) OF F9    TRANSMISSION COMPLETED
(0111000000000000)
FIG. 25(f)
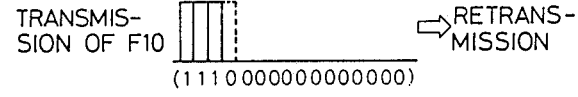
TRANSMISSION OF F10    ⇒ RETRANSMISSION
(1110000000000000)
RESPONSE OF NODE FN
RESPONSE OF NODE CS
RESPONSE OF NODE MT
RESPONSE OF NODE RN ACK TABLE      ACK SIGNAL
FIG.26(a) 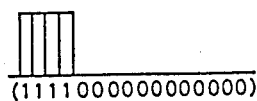 TRANSMISSION OF F4 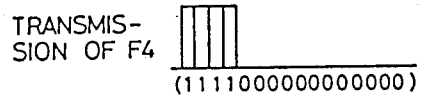 TRANSMISSION COMPLETED
(1111000000000000)    (1111000000000000)
FIG.26(b) TRANSMISSION OF F5 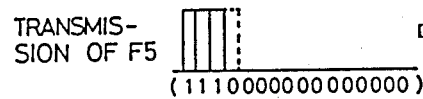 ⇨ RETRANSMISSION
(1110000000000000)
FIG.26(c) RETRANSMISSION(1) OF F5 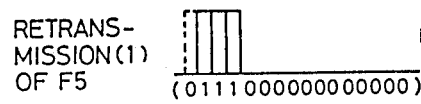 ⇨ RETRANSMISSION
(0111000000000000)
FIG.26(d) RETRANSMISSION(2) OF F5  ⇨ RETRANSMISSION
(1110000000000000)
FIG.26(e) RETRANSMISSION(3) OF F5  TRANSMISSION COMPLETED
(0111000000000000)
FIG.26(f) TRANSMISSION OF F6 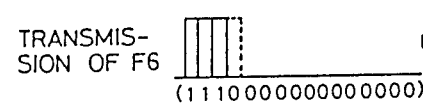 ⇨ RETRANSMISSION
(1110000000000000)
RESPONSE OF NODE FN
RESPONSE OF NODE CS
RESPONSE OF NODE MT
RESPONSE OF NODE RN

MULTIPLEX TRANSMISSION SYSTEM

BACKGROUND OF THE INVENTION

The present invention relates to a multiplex transmission system using a CSMA/CD (Carrier Sense Multiple Access/Collision Detection) transmission system.

There has been proposed a multiplex transmission system using a CSMA/CD transmission system, wherein a plurality of nodes are coupled together through a transmission path, data is transmitted frame by frame from any one of the nodes as a transmission node, and when the data is received properly, the reception node returns a reception acknowledgment signal to the transmission node upon reception of the frame.

FIG. 1 schematically shows the structure of a multiplex transmission system for vehicles which uses the CSMA/CD transmission system. As illustrated, a plurality of nodes comprising, for example, a front multiplex node FN, a combination switch node CS, a meter node MT, and a rear multiplex node RN, are coupled together through a multiplex transmission path (bus) MB composed, for example, of a twist pair type electric wire.

The front multiplex node FN is coupled to a front turn-right signal lamp 6, a front turn-left signal lamp 7, a front small lamp 8, and a horn 9. The combination switch node CS is coupled to a turn-right switch 10, a turn-left switch 11, a small lamp switch 12, a horn switch 13, and a head-lamp high beam switch 14. The meter node MT is coupled to a turn-right indicator 15, a turn-left indicator 16, and a head-lamp high beam indicator 17. The rear multiplex node RN is coupled to a rear turn-right signal lamp 18, a rear turn-left signal lamp 19, and a tail lamp 20 (which is turned on when the small lamp switch 12 is on).

In this multiplex transmission system for vehicles, vehicle driving information is transmitted for each frame F having the format as shown in FIG. 2.

The frame F includes as SD (Starting Delimiter) code, a destination address (16 bits), a local or source address, a data-length data, data 1 to data N, and a check code.

The SD code is a specific code indicating the start of the frame F. The destination address is designated by the value of a physical area assigned in the destination address field for each node, and not by the value of a physical address (or a real address). More specifically, an address area consisting of a plurality of bits is provided in the frame F to specify the destination address and is divided into a plurality of bit areas, and the divided bit areas are respectively assigned to the addresses of the nodes.

FIG. 3 illustrates an example of frame format including such a destination address field. In this example, each node is assigned with different one bit of the destination address field consisting of 16 bits. The 16 bits are respectively assigned to the nodes from the first bit in the ascending order of physical address of the nodes, and the nodes are designated by setting their respective bits to 1. For instance, to designate the nodes N3 and N5 as the destination, the destination address having its third and fifth bits from the start set to 1 and the remaining bits set to 0, i.e., 0010100000000000, needs to be transmitted. The destination address may not be assigned such that one bit is assigned to each node in the ascending order of physical address of the nodes; however, assigning the bits of the destination address field equally (e.g., 1 bit) in the order of physical address of the nodes serves to minimize the scale of the circuit for realizing the system.

In the local address field is written the address of that node which transmits the frame F, so that reception nodes, upon receiving this frame, can detect from which node the frame has been transmitted. The data length field is written with the number of data following this field; if there are N data, then N is written as indicating the data length. Upon reception of the frame, the reception nodes read the data by the data length. The transmission content of the frame following the data is the check code (error detection code) by means of which the end of the frame can be detected. In order to assure the data transmission, each reception node judges by means of the check code whether or not the contents of the received frame are correct, and if they are correct, the reception node sends its local address onto the transmission path MB as a reception acknowledgment (ACK) signal A.

An ACK field for the ACK signals has its ACK signal return areas assigned to the respective nodes in the same order as the destination address field, for the acknowledgment of proper reception of the frame. More specifically, the ACK signal return areas having the same length as the destination designation areas of the destination address are provided, and the ACK signal specific to each node is returned to the ACK signal return area assigned to this node.

In this example, if both of the nodes N3 and N5 have properly received the frame, the nodes N3 and N5 send 1 to the third and fifth bits of the ACK field, respectively, and the transmission node N1 receives 0010100000000000 as the ACK signals A3 and A5. The node N1, which transmitted the frame F, performs an operation as to whether or not the destination address coincides with the value of the ACK field, in order to judge whether or not the desired frame F has been properly transmitted to the destination. More specifically, when a node transmits the frame F to the destination and then receives the ACK signals from other nodes, it compares the information carried by the ACK signals with the information of the destination address of the frame, to discriminate the success/failure of the signal transmission. The multiplex transmission system described above will be hereinafter referred to as the first prior art system.

Apart from the first prior art system, another system shown in FIGS. 5(a-d), hereinafter referred to as the second prior art system, can also be used. As shown in FIG. 5(a), the frame format is the same in structure as the one shown in FIGS. 2 and 3(a-c). In this case, however, a functionally-given address (function address), not a physical address, is designated as a destination address, and the reception nodes return the ACK signals A as shown in FIGS. 5(b)-5(d) in accordance with this address. The function address mentioned here corresponds to the functional addressing mentioned in the article "A Proposal for a Vehicle Network Protocol Standard" presented in the SAE International Congress and Exposition (Feb. 1986).

In the example of FIG. 4, assuming that the physical addresses of the nodes N1–N5 are 1 to 5, respectively, the function address to be transmitted from the node N1 may be determined as illustrated in the following TABLE 1.

As seen from Table 1, the function address "4" indicates that the nodes N2 and N4 are the destination nodes, while the function address "5" indicates that the nodes N2, N4 and N5 are the destination nodes.

TABLE 1

| Function | Physical Address | | | |
| --- | --- | --- | --- | --- |
| Address | 2 | 3 | 4 | 5 |
| 1 | * | | | |
| 2 | | * | | |
| 3 | | | * | |
| 4 | * | | * | |
| 5 | * | | * | * |
| 6 | | * | | * |

In the second prior art system, the individual nodes N1-N5 have their respective correlation tables for transmission use between the function addresses and the physical addresses, as shown in TABLE 1 illustrating an example of the table for the node N1, so as to be able to recognize to which physical nodes to transmit the frame. The individual nodes also have their respective reception function tables for reception use, as shown in TABLE 2 illustrating an example of the table for the node N4, so that it can recognize the frames of which function addresses to receive.

TABLE 2

| Function Address To Be Received By Node N4 |
| --- |
| 3 |
| 4 |
| 5 |
| 8 |
| 11 |
| 14 |
| . |
| . |
| . |

In this example, the first three function addresses ("3," "4" and "5") are to be transmitted from the node N1, and the following three function addresses ("8," "11" and "14") are to be transmitted from the node N2.

Assuming that the data B is to be transmitted from the node N1 to the nodes N3 and N5, it is understood from the function address-physical address correlation table (TABLE 1) that the data can be simultaneously transmitted to the nodes N3 and N5 by setting the function address to "6."

In this manner, the frame F is transmitted from the node N1, as shown in FIGS. 6(a-c). The nodes N3 and N5 recognize that they should receive the frame F, based on their own reception function tables (similar to that shown in TABLE 2 for the node N4).

The nodes N3 and N5 receive the frame F, and then return their local addresses as the ACK signals A to the node N1, as shown in FIGS. 6(b)-6(c), if no data error is detected by means of the check code. In this case, the ACK signals A may simultaneously be returned from a plurality of nodes. This can be solved by designing each of the nodes to have the bit-by-bit collision detection function, the transmission inhibition function from the succeeding bit, as well as the ACK signal re-transmission function. With this design, therefore, upon completion of the frame transmission, the ACK signals from the nodes which have received the frame F are set in the order of strength of the address codes with regard to the transmission path structure.

The node that has transmitted the frame F collates the returned ACK signals with the function address-physical address correlation table for transmission use, such as the one shown in TABLE 1, to detect if the ACK signals are returned from all the nodes which should receive the frame F.

If the ACK signal is not returned from any one of the expected reception nodes, the same frame is re-transmitted.

In multiplex transmission systems for vehicles already known, inclusive of the above-mentioned two systems, in order to determine whether or not any of the multiplex nodes is defective, a "trouble-discrimination request frame" is transmitted regularly from a trouble-discriminating multiplex node to the other multiplex nodes. More specifically, the trouble-discriminating multiplex node transmits the "trouble-discrimination request frame" at regular intervals separately from the transmission of ordinary control data. If all the multiplex nodes return the reception acknowledgment signals, the trouble-discriminating multiplex node judges that all of the multiplex nodes are normal. If the reception acknowledgment signal is not returned from any one of the multiplex nodes, the trouble-discriminating multiplex node judges this node to be defective. Thus, the trouble-discriminating multiplex node serves to check the function of the other nodes.

According to the first prior system, however, a problem arises in that, when those multiplex nodes which are not registered as the destination address are required to receive a frame data due to the change of design, for example, the destination address must be modified each time when necessary. A multiplex transmission system capable of flexibly updating the destination address may be employed. However, if the addresses of the necessary multiplex nodes are deleted from the destination address by mistake, the nodes cannot receive the frame.

Similarly, the second prior art system is disadvantageous in that when the design is changed, the recognition pattern of the function addresses of each of the nodes, shown in TABLES 1 and 2, must be changed.

The multiplex transmission systems for vehicles have different multiplex node structures depending on the model and class or grade of vehicles, due to diverse requirements for the functions to be provided. Furthermore, there are three states in respect of power supply in ordinary vehicles, i.e., a "+B" state wherein power is all the time supplied from the batery even if the engine key is in an off position, an "ACC" state wherein power is supplied when the engine key is in an "accessory" position, and an "IG" state wherein power is supplied when the engine key is in an "ignition ON" position. One of these three states of power supply is selected in accordance with the position of the engine key, i.e., the driving condition of the vehicle. Since the multiplex nodes to be supplied with power differ depending on their usage, the operating multiplex node structure of the multiplex transmission system must be changed simultaneously with the changeover among the three states of power supply.

In some cases, a multiplex node may become defective due to some abnormality. In the case of a multiplex transmission system for vehicles which has the re-transmission function mentioned above and in which the data to be compared with the ACK signals (i.e., the destination address in the first prior art system, or the function address-physical address correlation table in the second prior art system) is not changed, it is hard to suitably set the system in accordance with the model and grade of vehicles as well as the power supply states mentioned above. If a multiplex node becomes defective, moreover, the frame must be re-transmitted each time the frame transmission is made, which leads to an increase in transmission amount, i.e., traffic amount.

In order to realize the function addressing of the second prior art system, the multiplex transmission processing circuit of each node is required to have a memory with large capacity for storing both the function address-physical address correlation table for transmission use and the function address table for reception use, and a memory control circuit. This results in an increase in scale of the circuit of the system and in cost.

The conventional trouble discrimination method uses a special message for this purpose only, and therefore, the transmission amount is increased. In addition, the trouble-checking multiplex node, i.e., trouble-discriminating multiplex node, is supplied with the trouble discrimination data from all the other multiplex nodes. Thus, the method has a problem in that if the trouble-discriminating multiplex node itself becomes defective, it will wrongly judge that some nodes are defective, even when the nodes are non-defective, or the trouble discrimination itself cannot be carried out.

OBJECTS AND SUMMARY OF THE INVENTION

An object of the present invention is to provide a multiplex transmission system which allows the addresses of multiplex nodes to be added or deleted easily without requiring the scale of the circuit of the system to be changed, and which can minimize the traffic amount.

Another object of the invention is to provide a multiplex transmission system which is capable of checking all the time the trouble of the multiplex nodes with a small-scale circuit, without causing an increase of the transmission amount.

The present invention provides a multiplex transmission system, in which one of a plurality of nodes, as a transmission node, coupled together through a transmission path transmits data frame by frame to the transmission path, and reception nodes each deliver a reception acknowledgment signal onto the transmission path upon proper reception of the frame of data.

In the multiplex transmission system of the invention, the frame has a reception acknowledgment signal area including a plurality of divisions assigned to nodes, respectively, and each of the nodes includes a reception acknowledgment signal table consisting of information units each of which corresponds to a respective one of the divisions of the reception acknowledgment signal area. The nodes each discriminate the success/failure of signal transmission by comparing the information in the reception acknowledgment signal area with the information registered beforehand in the reception acknowledgment signal table. When the information registered in the reception acknowledgment signal table does not coincide with the information of the reception acknowledgment signal area, the transmission node re-transmits the frame of data and the reception acknowledgment signal tables of all of the nodes are updated.

Preferably, the nodes each compare, unit by unit, the information of the reception acknowledgment signal area with the information registered beforehand in the reception acknowledgment signal table, and update the reception acknowledgment signal table based on the result of the comparison of each information unit.

Still preferably, when the information in the reception acknowledgment signal area does not coincide with the information of the reception acknowledgment signal table continuously a predetermined number of times while the success/failure of signal transmission is discriminated frame by frame with respect to a plurality of frames transmitted continuously, the information of the reception acknowledgment signal table is updated to the information in the reception acknowledgment signal area.

The defectiveness of each of the nodes may be judged based on updating and non-updating of the information in the reception acknowledgment signal table, or based on the integrated value of updating of the reception acknowledgment signal table representing the deletion and addition of the information in the reception acknowledgment signal table.

According to another aspect of the invention, the transmission node compares, unit by unit, the information in the reception acknowledgment signal area with the information registered beforehand in the reception acknowledgment signal table, and re-transmits the frame only when no reception acknowledgment signal has been returned to the reception acknowledgment signal area from a node that should return the reception acknowledgment signal. When the reception acknowledgment signal of the node did not appear even once in the reception acknowledgment signal areas in the transmitted and re-transmitted frames, the transmission node repeats re-transmission of the frame up to a predetermined number of times.

According to still another aspect of the invention, the transmission node stores beforehand normal reception acknowledgment signals of the reception acknowledgment signal area, and compares the reception acknowledgment signals in the reception acknowledgment signal area returned in response to the transmission of each frame with the stored reception acknowledgment signals, so as to judge the defectiveness of each of the nodes based on the result of the comparison. In this case, the transmission node may judge a node to be defective when the node fails to return the reception acknowledgment signal a predetermined number of times on end during a continuous transmission of frames. Alternatively, the number of times the reception acknowledgment signal is not returned to the transmission path may be integrated for each of the nodes during frame transmission to the transmission path, and when the integrated value associated with a node reaches a predetermined value within a predetermined period, the node may be judged to be defective.

The above and other objects, features and advantages of the invention will become apparent from the ensuing detailed description taken in conjunction with the accompanying drawings.

BRIEF DESCRIPTION OF THE DRAWINGS

FIGS. 3(a-c) is a diagram schematically illustrating an example of data transmission from one multiplex node to other two multiplex nodes in the conventional multiplex transmission system shown in FIG. 2;

FIG. 4 is a block diagram illustrating the structure of another conventional multiplex transmission system for vehicles;

FIGS. 5(a-d) and 6(a-c) are timing charts illustrating the relationship between the frame format and reception acknowledgment (ACK) signals of the conventional multiplex transmission system in FIG. 4;

FIG. 7 is a diagram illustrating an example of frame format used in a multiplex transmission system of the present invention;

FIGS. 8(a-e) is a timing chart illustrating the relationship between the frame transmission and the return of the ACK signals in the case where data is transmitted from one multiplex node to other three multiplex nodes by use of the format shown in FIG. 7;

FIG. 9 is a diagram illustrating the transmission and re-transmission of the frame;

FIGS. 10(a-f) to 15(a-i) are waveform diagrams illustrating various examples of frame transmission and re-transmission and various examples of updating of the reception acknowledgment signal table (ACK table) in the case where the ACK signals in the reception acknowledgment signal area do not coincide with the ACK table;

FIG. 16 is a waveform diagram illustrating a binary logic in the case where a pulse-width modulated (PWM) code is used as a transmission code;

FIG. 17 is a waveform diagram illustrating the return timing of the ACK signal from each reception node in the case where the PWM code is used as a transmission code;

FIGS. 21 to 23 are diagrams showing other examples of frame format used in the multiplex transmission system of the invention;

FIGS. 24(a-c) is a waveform diagram illustrating a binary logic in the case where a PWM code, the logic of which is opposite to that of the PWM code of FIG. 16, is used as a transmission code;

FIGS. 25(a-f) and 26(a-f) are waveform diagrams illustrating other various examples of frame transmission and re-transmission and of updating of the ACK table observed in the case where the ACK signals in the reception acknowledgment signal area do not coincide with the ACK table in the multiplex transmission system of the invention;

DETAILED DESCRIPTION

Figure 1:
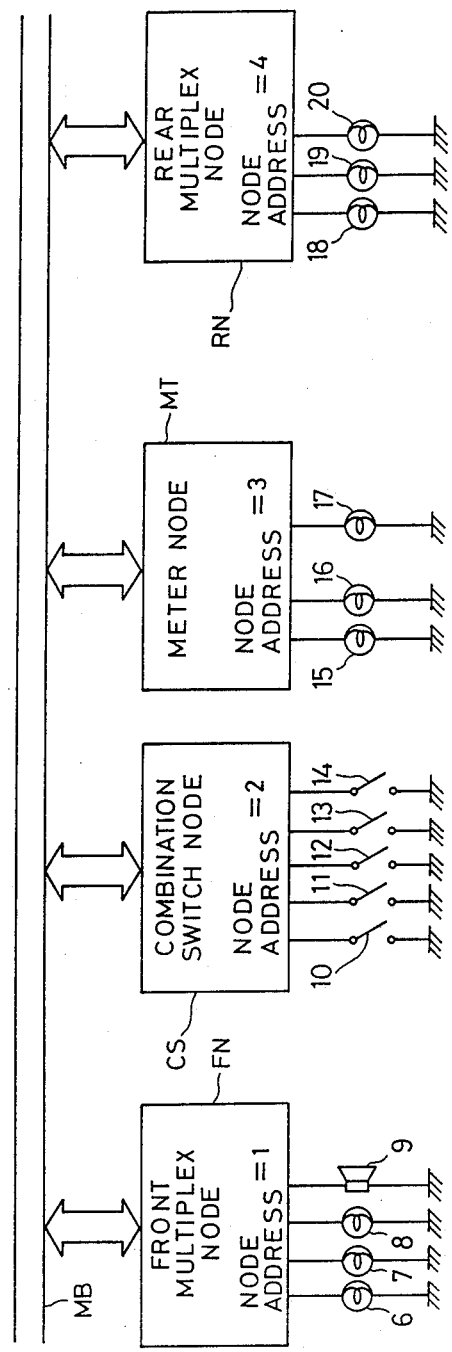
FIG. 1 is a block diagram illustrating the structure of a multiplex transmission system for vehicles, using a CSMA/CD transmission system.
Figure 2:
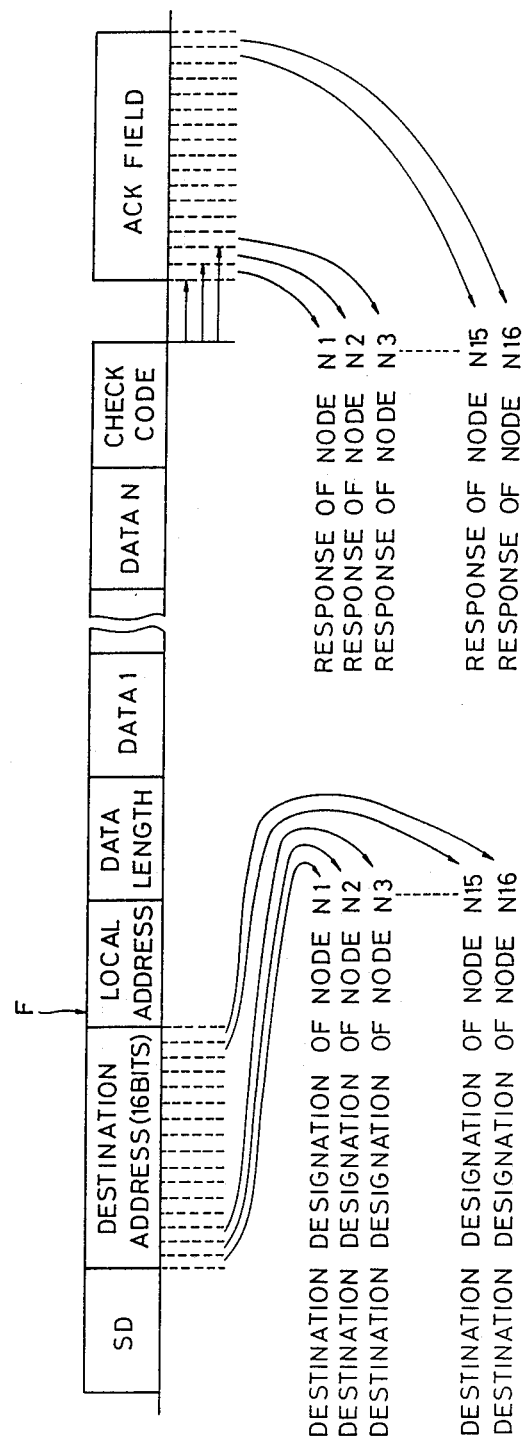
FIG. 2 is a diagram schematically illustrating an example of frame format used in a conventional multiplex transmission system.
Figure 11B:
Figure 11C:
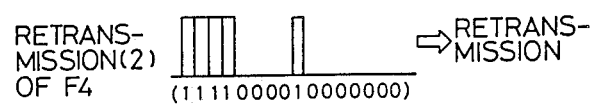
Figure 11D:
Figure 11E:
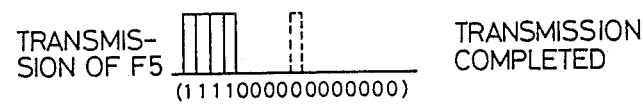
Figure 11F:
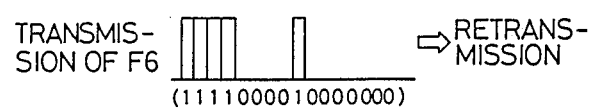
Figure 11G:
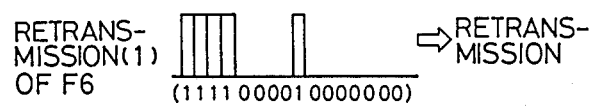
Figure 11H:
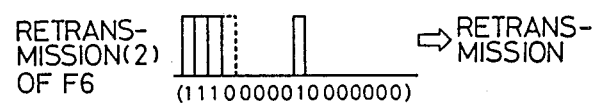
Figure 11I:
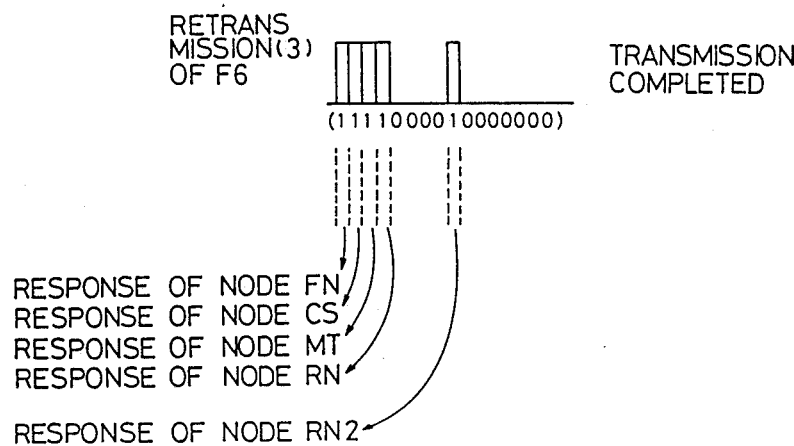

FIG. 7 is a diagram schematically illustrating an example of frame format used in the multiplex transmission system of the present invention. This frame format is exactly the same as that shown in FIG. 5(a), in which the functionally-given address (function address), not the physical address, is used as the destination address. The reception acknowledgement signal field (ACK field) consists of a plurality of bits (divisions), e.g., 16 bits, and has bit areas assigned to the respective addresses of the multiplex nodes for the purpose of acknowledgment of proper reception of data. More specifically, each of the reception multiplex nodes checks the contents of all the received frames, regardless of their destination addresses, by means of the check code, and if no data error is detected, it returns the reception acknowledgment signal (ACK signal) specific thereto to that bit area of the ACK field which corresponds to the address thereof. In the format shown in FIG. 7, the node addresses of the front multiplex node FN, combination switch node CS, meter node MT and rear multiplex node RN are set to 1, 2, 3 and 4, respectively. FIG. 8 shows the case where the combination switch node CS transmits the signals input to the switches connected there to the multiplex to the switches connected thereto the multiplex transmission path MB. As shown in FIG. 8(a), the combination switch node CS as the transmission multiplex node sends "1" to the second bit area of its ACK field, which area is the ACK return area assigned thereto. If the front multiplex node FN, meter node MT, and rear multiplex node RN properly receive the data, they return ACK signals A1, A3 and A4, respectively, to the multiplex transmission path MB, as shown in FIGS. 8(b)-8(d). In this case, each multiplex node receives the frame and the ACK signals (1111000000000000) shown in FIG. 8(e).

Each of the multiplex nodes has a reception acknowledgment signal table (ACK table) with the same arrangement of bits as the ACK signals. The combination switch node CS, which is the transmission multiplex node, collates its ACK table with the received ACK signals to determine whether or not the former coincides with the latter, thereby discriminating the success/failure of the transmission of the desired frame F. Let it be assumed that the ACK table of the combination switch node CS stores data of "1111000000000000", and that no ACK signal A4 is returned from the rear multiplex node RN to the combination switch node CS for the reason that the rear multiplex node RN did not properly receive the frame F, or is not powered, broken or disconnected from the multiplex transmission path MB. In such cases, the received ACK signals do not coincide with the ACK table, and therefore, the combination switch CS re-transmits the same frame F.

In general, the multiplex node structure of multiplex transmission systems varies depending on the model and grade or class of vehicles, due to diverse requirements for the functions to be provided. Furthermore, there are three states of power supply in an ordinary vehicle, as mentioned above, i.e., the "+B" state, "ACC" state and "IG" state, one of which is selected in accordance with the position of the engine key, i.e., the driving condition of the vehicle. The multiplex nodes to be supplied with power differ depending on their usage, and therefore, the operating multiplex node structure of the multiplex transmission system may be changed simultaneously with the changeover of the power supply states. One of the multiplex nodes, moreover, may become defective. In the multiplex transmission system for vehicles which has the frame re-transmission function mentioned above and in which the data in the ACK table is not changed, it is hard to set the system in accordance with the model and grade of vehicles and the power supply states. If any of the multiplex nodes becomes defective, frame re-transmission must be performed each time a frame is transmitted, which results in an increase in transmission amount, i.e., traffic amount. In view of the circumstances, according to the multiplex transmission system of the present invention, a comparison is made between the ACK signals and the content (information) of the ACK table to discriminate the success/failure of signal transmission and, as needed, the signal re-transmission is effected or the content of the ACK table is updated.

For example, in the case of the system having the frame re-transmission function, the content of the ACK table is updated when the ACK signals remain the same a predetermined number of times during the transmission, re-transmission and reception of frame. More specifically, the maximum number of times the same frame is transmitted is 4, and the ACK table is updated when the same ACK signals are returned four times consecutively during the frame transmission, re-transmission and reception. In this case, with the multiplex transmission system for vehicles shown in FIG. 1, if no ACK signal is returned from the rear multiplex node RN four times in response to the transmission and re-transmissions (1), (2) and (3) of the frame "2", as shown in FIGS. 10(b)–10(e), the ACK table is updated by deleting or canceling the registration of that bit in the ACK table which corresponds to the address of the rear multiplex node RN.

There may be the situation wherein a multiplex node in the multiplex transmission system fails to return the ACK signal specific thereto once or thereabouts relative to the above-mentioned predetermined number of times (i.e., approximately in a ratio of one to the predetermined number). For example, the control circuit or microcomputer of the node for processing the received frame may be busy with other control and can process the received frames in the above ratio at most, or noises may be produced in the proximity of the node in the ratio and data error is erroneously detected by the check code, with the result that no ACK signal is returned from the node. In such cases, the ACK table will hardly be updated, as shown in FIGS. 11,(a)–11(i) and the transmission amount will increase. In this example, a new rear multiplex node RN2 (not shown), the node address of which is "9," is added in the multiplex transmission path MB, and it is assumed that the rear multiplex nodes RN1 and RN2 fail to return their ACK signals in the ratio of about one to four (i.e., about once relative to four times of data reception).

The situation that the ACK table is hardly updated while the transmission amount is increased can be eliminated by an improved system of the present invention.

FIGS. 12(a)–12(i) are diagrams for illustrating the updating of the ACK table used in the improved system of the invention. This improved system is identical in structure with the above-described multiplex transmission system using the CSMA/CD transmission system, and uses a frame format identical to the one described above. In this transmission system for vehicles, each of the multiplex nodes includes an ACK table having the same arrangement of bits as the ACK signals (16 bits in this example). The combination switch node CS, which is a transmission multiplex node as in the case of FIG. 8, performs an operation to determine whether or not each bit of the received ACK signals coicides with the ACK table, thereby discriminating the success/failure of the transmission of the desired frame F to the multiplex nodes.

In the improved system of FIG. 12, the number of times the same frame is repeatedly transmitted is 4, as in the case explained with reference to FIGS. 10 and 11(a)–11(i) FIGS. 12(a)–12(i) illustrate an example of updating of the ACK table, in which when the content of a bit in the ACK signals continues to be the same four times consecutively during the frame transmission, re-transmission and reception, a bit of the ACK table corresponding to the above bit is updated. More specifically, if the content of a bit of the ACK signals continues to disagree with the content of the corresponding bit in the ACK table a predetermined number of times during the transmission, re-transmission and reception of data, the content of this bit in the ACK table is updated to that of the corresponding bit in the ACK signals. In this example, similar to the case in FIGS. 11(a)–11(i) the rear multiplex node RN2 (node address "9") is newly added to the multiplex transmission path MB, and it is assumed that the rear multiplex nodes RN and RN2 fail to return their ACK signals approximately in the ratio of one to four (four times of reception). Such a situation will arise when the control circuit or microcomputer for processing the data received by the node concerned is busy with control other than the reception data processing and therefore cannot process the received data, or when noises are produced near the node and the content of the frame is detected to be erroneous by means of the check code, thus failing to return the ACK signal.

Figure 12D:
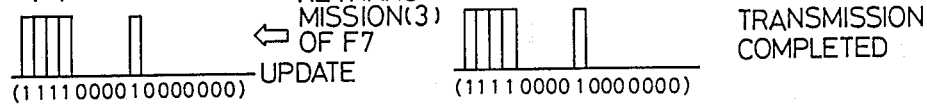
Figure 12F:
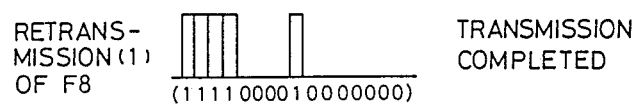
Figure 12G:
Figure 12H:
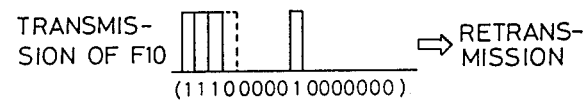
Figure 12I:
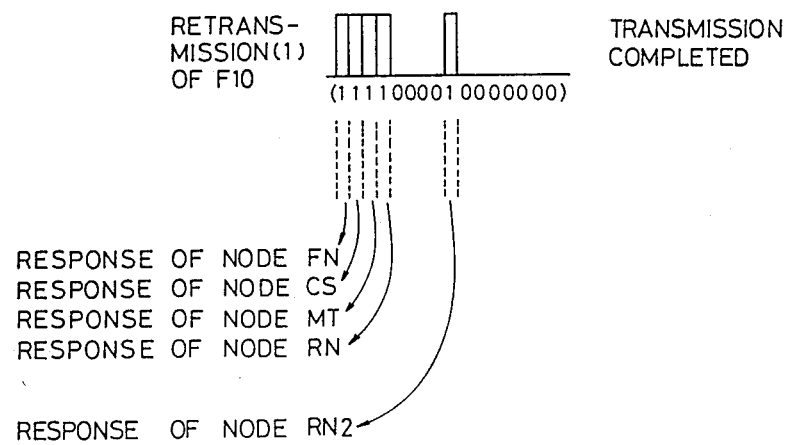

In the system of FIGS. 11(a)–11(i) in which the content of the ACK signals is collectively compared with that of the ACK table, the updating of the ACK table is not effected for the reason that the fourth bit of the ACK signals, i.e., the ACK signal from the rear multiplex node RN, is unstable. In the system of FIGS. 12(a)–12(i) wherein the content of the ACK signals is compared bit by bit with that of the ACK table and the ACK table is updated bit by bit, on the other hand, even if a multiplex node responds unstably, as shown in FIG. 12(b), those bits in the ACK table corresponding to the multiplex nodes which respond stably more than the predetermined number of times, i.e., more than four times, are updated, as shown in FIG. 12(d) illustrating the updating of the ACK table at the time of the re-transmission (3) of the frame F7. Thus, the number of times the same frame is re-transmitted can be reduced.

Figure 13A:
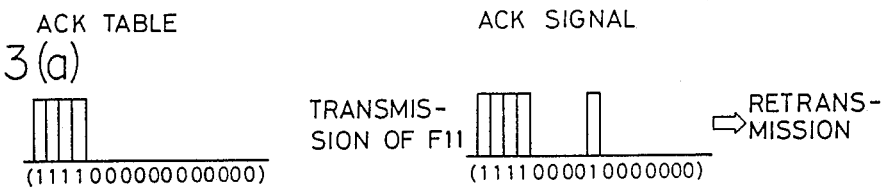
Figure 13B:
Figure 13C:
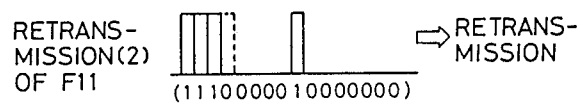
Figure 13D:
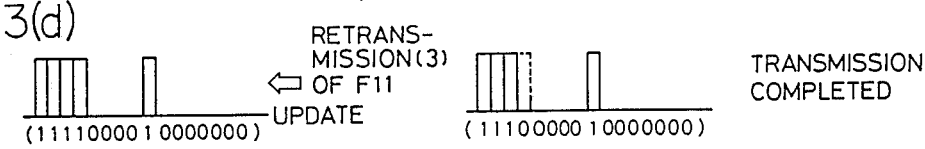
Figure 13E:
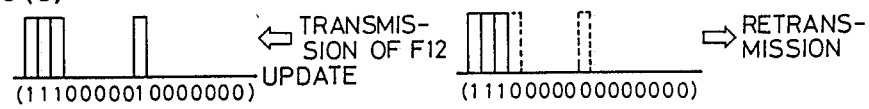
Figure 13F:
Figure 13G:
Figure 13H:
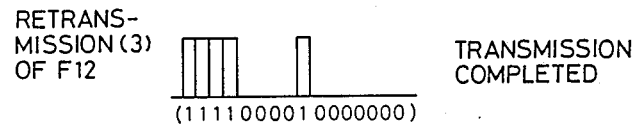
Figure 13I:
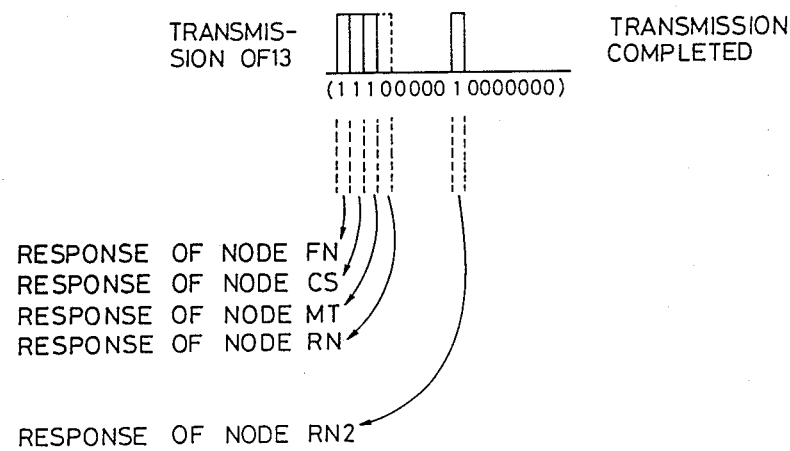
Figure 14B:
Figure 14C:
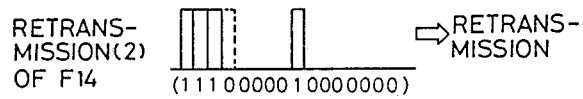
Figure 14D:
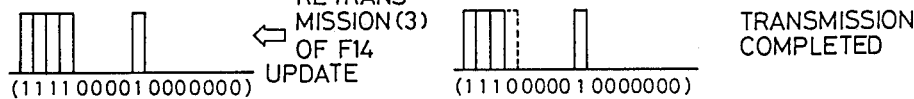
Figure 14E:
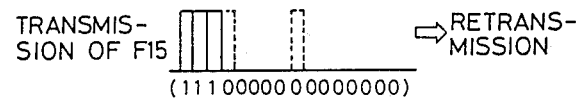
Figure 14F:
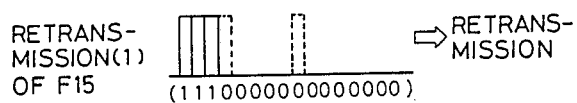
Figure 14G:
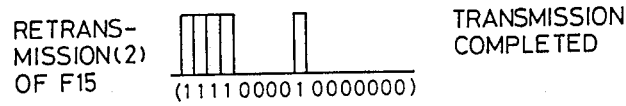
Figure 14H:
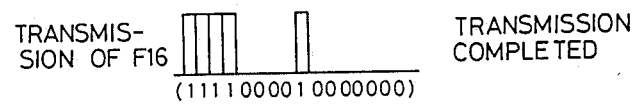
Figure 14I:
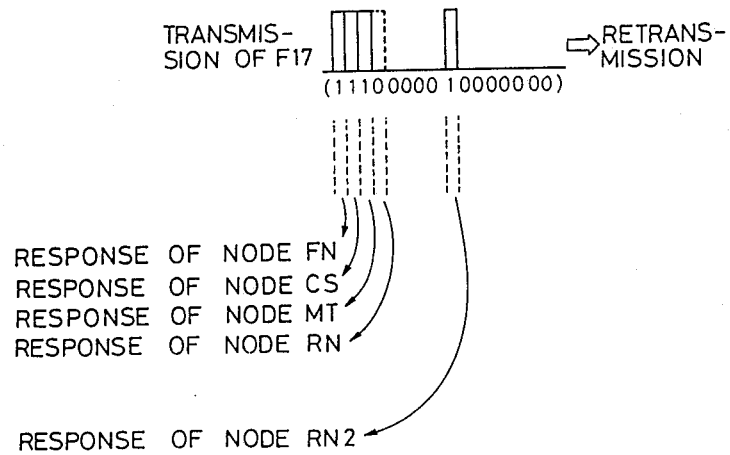
Figure 15F:
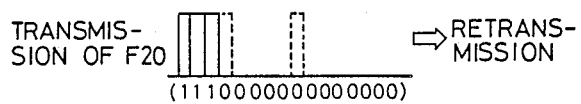
Figure 15G:
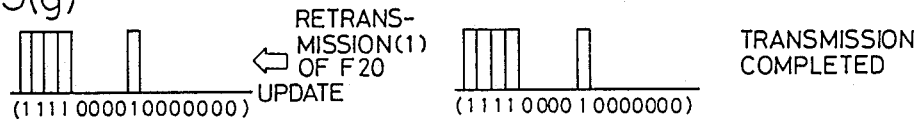
Figure 15H:
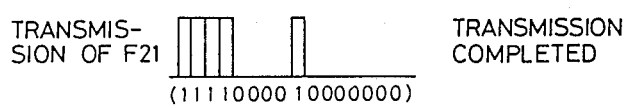
Figure 15I:
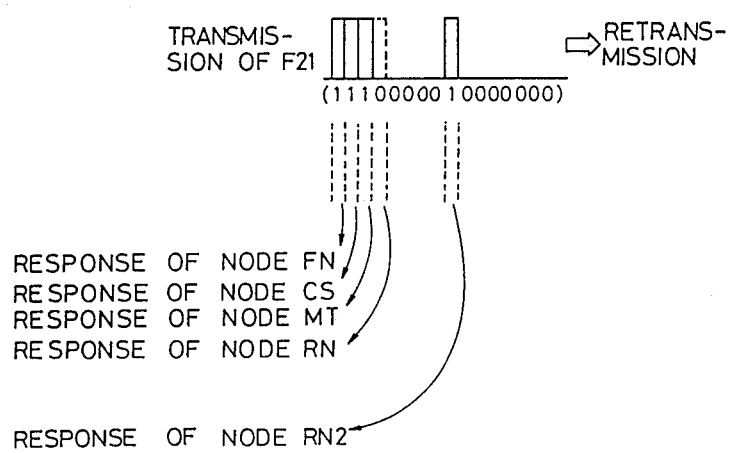

FIGS. 13(a)–13(i) show an example of updating of the ACK table in which the rear multiplex node RN fails to return its ACK signal approximately in the ratio of three to four (i.e., three times relative to four times of reception) under the same conditions as in the case of FIGS. 11(a)–11(i) and 12(a)–12(i). In FIGS. 13(a)–13(i), the updating of the ACK table, i.e., the addition of the bit (ninth bit) corresponding to the rear multiplex node RN2 to the ACK table, is effected at the time of the re-transmission (3) of the frame F11, as shown in FIG. 13(d). Thus, the updating of the ACK table is performed after the frame F11 is transmitted and re-transmitted four times in total. On the other hand, another updating of the ACK table, i.e., the deletion of the fourth bit corresponding to the rear multiplex node RN from the ACK table, is effected at the time of the transmission of the frame F12, shown in FIG. 13(e), that is, after the frame F12 is transmitted only once. Considering that the rear multiplex node RN failed to return its ACK signal consecutively four times before the bit of the ACK table corresponding this node is deleted (i.e., from the re-transmission (1) of the frame F11, shown in FIG. 13(b) to the transmission of the frame F12, shown in FIGS. 13(a)–13(i), and that the situation of FIG. 13 rarely occurs, highly reliable signal transmission can be achieved with the system of FIGS. 12(a)–12(i) and 13(a)–13(i). Furthermore, the transmission amount can be reduced. This system, however, may not be suitable for a multiplex transmission system for vehicles which is required to have high reliably, since the ACK table is updated, particularly a bit is deleted, after a new frame is transmitted only once.

In view of this, the present invention provides a still preferred system, wherein when the content of a bit in the ACK signals continues to disagree with that of the corresponding bit in the ACK table a predetermined number of times on end during the transmission and re-transmission of the same frame and at the same time the content of this bit in the ACK signals remains the same, the content of the bit of the ACK table is updated to the content of the corresponding bit in the ACK signals. FIGS. 14(a)–14(i) show an example of updating of the ACK table wherein the maximum number of times the same frame is transmitted is 4, as in the case of FIGS. 12(a)–12(i) and 13(a)–13(i) and when the content of a bit in the ACK signals continues to be the same four times on end during the transmission and re-transmission of the same frame, the content of the corresponding bit in the ACK table is updated. Similar to the cases of FIGS. 11(a)–11(i) to 13(a)–13 (i), the rear multiplex node RN2 (node address "9") is newly added to the multiplex transmission path, and it is assumed that the rear multiplex node RN fails to return its ACK signal approximately in the ratio of three to four (four times of reception) while the rear multiplex node RN2 fails to return its ACK signal approximately in the ratio of one to four (four times of reception).

As illustrated in FIGS. 14(a)–14(i), the registration of the bit concerned is not deleted even at the time of the transmission of the frame F15, shown in FIG. (e). The transmission of the frame F15 is completed with the second transmission of the same frame F15, i.e., at the time of the re-transmission (2) of the frame F15, shown in FIG. 14(g). Thus, this system can achieve higher reliability required for the multiplex transmission for vehicles.

In the aforementioned systems, the frame transmission is not necessarily completed when the ACK table is updated (FIGS. 13(a)–13(i). According to this system of FIGS. 14(a)–14(i), on the other hand, the updating of the ACK table takes place together with the completion of the frame transmission. It is therefore possible to make a final determination as to the success/failure of the frame transmission based on the updating/non-updating of the ACK table. In the system of FIGS. 14(a)–14(i), moreover, the ACK table of all the multiplex nodes on the multiplex transmission path are concurrently updated in response to the reception of the same frame, which leads to reduction of the transmission amount caused by the frame re-transmission at the time of updating.

As mentioned above, FIGS. 13(a)–13(i) illustrates an example of updating of the ACK table, in which the rear multiplex node RN fails to deliver its ACK signal in the ratio of about three to four (i.e., three times out of four times of reception) under the same conditions as in the case of FIGS. 11(a)–11(i) and 12(a)–12(i). In FIG. 13, the updating of the ACK table regarding the rear multiplex node RN, i.e., the deletion of the fourth bit corresponding to the node RN, is effected at the time of transmission of the frame F12 shown in FIG. 13(e), and thereafter the registration of this bit remains unchanged (deleted) in the ACK table. Once a bit is deleted from the ACK table of a multiplex node which is connected to the multiplex transmission path MB but has low responsiveness, such a bit is hardly restored, and while the bit is deleted, the signal transmission cannot be regarded as reliable.

According to a still further preferred system of the invention, the information of the ACK table is compared bit by bit with the information carried by the ACK signals, and when a multiplex node registered in the ACK table fails to return its ACK signals a predetermined number of times and end, the registration of the corresponding bit in the ACK table is canceled. On th other hand, when a multiplex node which is not registered in the ACK table returns its ACK signal once or continues to return the signal a number of times smaller than the above-mentioned predetermined number, the bit concerned is registered in the ACK table. FIGS. 15(a)–15(i) illustrate an example of updating of the ACK table, wherein the maximum number of times the same frame is transmitted is 4, as in the above-described examples. In this example, when a multiplex node fails to return its ACK signal four times on end during the transmission, re-transmission and reception of the same frame, the registration of the corresponding bit in the ACK table is deleted, while when a multiplex node returns its ACK signal even once, a bit for this node is registered in the ACK table. Similar to the prior examples, the rear multiplex node RN2 (node address "9") is newly added onto the multiplex transmission path MB. Further, it is assumed that the rear multiplex node RN fails to return its ACK signal approximately in the ratio of three to four (three times out of four times of frame reception), and that the rear multiplex node RN2 fails to return its ACK signal in the ratio of about one to four (four times of reception).

In the system of FIGS. 13(a)–13(i) after the bit (fourth bit) corresponding to the rear multiplex node RN is deleted at the time of transmission of the frame F12, the registration of this bit reamains unchanged (deleted), as described above. In the system of FIGS. 15(a)–15(i), on the other hand, after the bit is deleted at the time of the re-transmission (3) of the frame F19, shown in FIG. 15(e), it is again registered at the time of the re-transmission (1) of the frame F20 (FIG. 15(g). In this manner, when a bit is not registered in the ACK table but the ACK signal corresponding to this bit appears in the ACK field, the bit is registered in the table without the re-transmission of the frame being effected. Consequently, the system can resume its normal state in a short period of time and with a small transmission amount, in comparison to the system of FIGS. 13(a)–13(i).

The information of the ACK table or the integrated value thereof, which are updated as described above, can be used to perform trouble discrimination easily, as described below.

In returning one bit of the ACK signal in the ACK field, as in the aforementioned examples, it is difficult to get the transmission timing. However, with the use of the PWM (pulse width modulation) codes as shown in FIGS. 16(a) and 16(b) (where the phase 1 indicates the beginning of a logical 1 bit, the phase 2 indicates a logical "1" when it is "1" and a logical "0" when it is "0", and the phase 3 is a "0" duration temporarily set for phase for phase (1), transmitting the portion of the phase 1 from the transmission node can ensure that all the nodes easily get the transmission timing in the ACK field, as shown in FIGS. 17(a) to 17(d). That is, in this case, the PWM code for discriminating the binary logic (logic 1 or logic 0) based on the wideness or narrowness of the pulse width is used as the transmission code.

In this embodiment, 16 nodes can be coupled together at the maximum; however, an increase in the number of nodes to be coupled to the multiplex transmission path can be coped with increasing the length of the ACK field.

Figure 18:
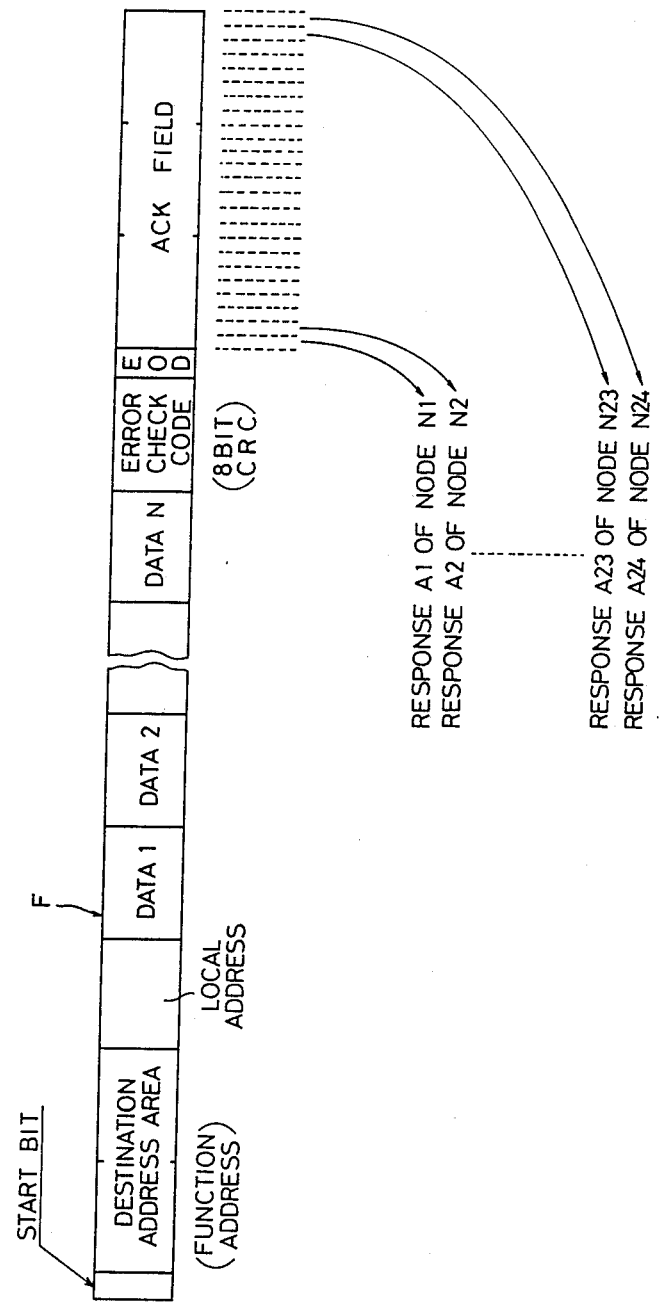
FIG. 18 is a schematic diagram illustrating the frame format used in the case where the PWM code is used and the maximum number of connectible nodes is 24.

FIG. 18 illustrates an embodiment of the invention which uses the PWM codes and in which the maximum number of connectible nodes is 24. An EOD (end of data) appearing in FIG. 18 is a special code for indicating the end of data, which is neither logic 1 nor logic 0, as shown in FIG. 19(c). The receiving side recognizes the end of data upon receiving this code by one bit. In the embodiment of FIG. 18, the preceding one byte to the detection of the EOD code is an error check code (18-bit CRC in this embodiment), and the preceding N bytes to this error check code after the end of the local address can be recognized as actual data.

Figure 20:
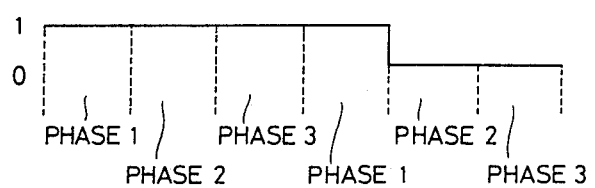
FIG. 20 is a waveform diagram illustrating an example of start bit.

In this case, a code for indicating the start of the frame need not be of a special form such as the SD code used in the aforementioned embodiment, but may be a code as shown in FIG. 20 (which has a continuous high-level duration over 4 phases). All the nodes except the transmission node can recognize the start of the frame by detecting this code.

The foregoing embodiments can be applied also to the case where the data length is fixed. In this case, the EOD indicating the end of the data need not be provided, but it may be used to provide a sufficient time for error checking on the receiving side.

Figure 21:
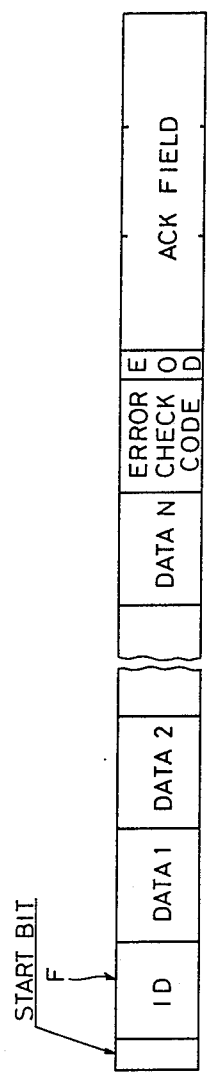

In the above embodiments, the destination address (fundtion address) and the address of the transmission node (local address) are included in the frame as a frame identifier. FIG. 21 illustrates a frame format wherein the destination address and the local address are not separately included in the frame but a frame identification code ID is provided without regard to the node address. The user of the ID code makes it possible to recognize the frame without regard to the node address. Even in the case of modifying a transmission node for a certain switch signal due to the requirements of vehicle design, the data decryption software of the reception nodes need not be modified at all, though the signal processing on the part of the transmission node should naturally be modified.

Figure 22:
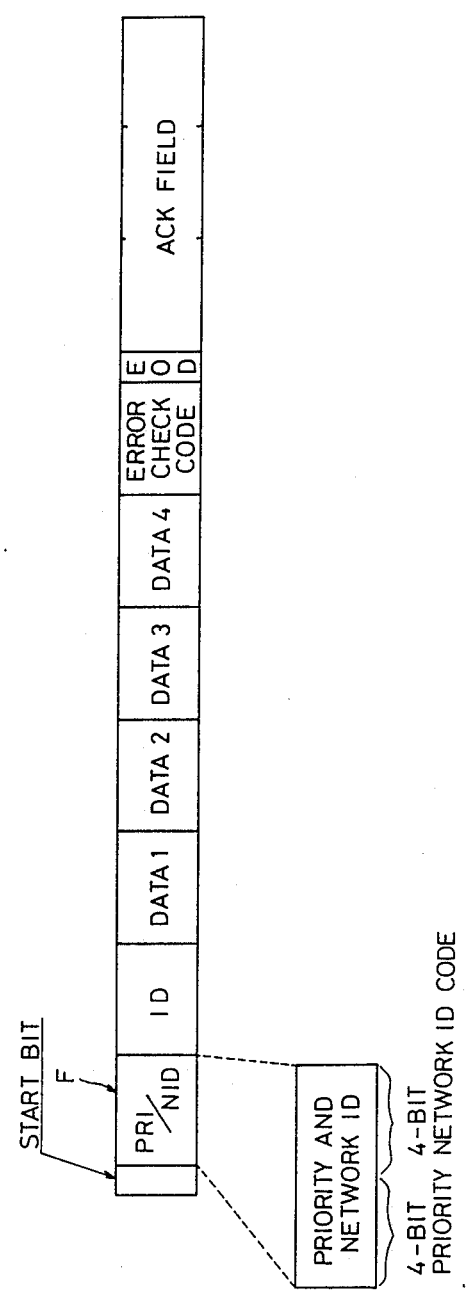

In the case where various message types with different addressing systems are affixed at the beginning of the frame, the fram format as shown in FIG. 22 can be easily realized which has a priority and a network identification code preceding to the frame identification code of the format shown in FIG. 21. In the frame format shown in FIG.22, the data length is of a fixed type (4 bytes). The format, however, can of course be applied to the case where the amount of all the data is variable. In the format of FIG. 22, the code for priority and network identification is constituted by a 4-bit priority and a 4-bit network ID code, for example. The greater the priority number, the higher the priority given at the time of collision. The network ID code is used to effectively perform trouble discrimination, e.g., to automatically perform the trouble discrimination of each network in off-board trouble discrimination in the case where there is a plurality of networks within a single vehicle, for example, a large subsystem such an information apparatus constitutes a separate network.

Another purpose of using the network ID code is to enable a common trouble-discriminating apparatus to be used with different signaling tables developed by different automobile manufacturers for off-board trouble discrimination. More specifically, when the common trouble-discriminating apparatus is coupled to the multiplex bus of a vehicle, it discriminates the group of vehicle models by means of the network ID code in the frame. The apparatus then reads out the file of signaling table corresponding to the vehicle mode, and performs trouble discrimination based on the file.

Figure 19:
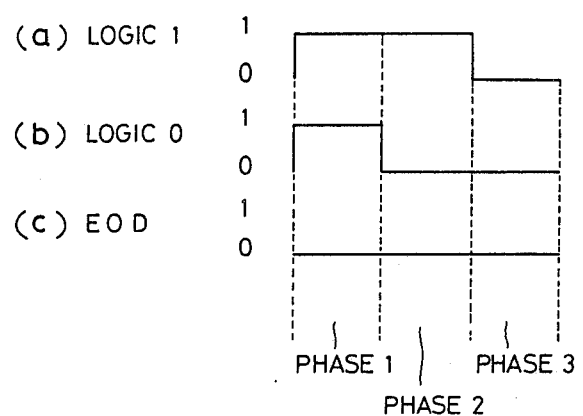
FIG. 19 is a waveform diagram illustrating a binary logic in the case where the PWM code is used as an EOD (end of data)

FIG. 23 illustrates a multiplex transmission system according to another embodiment of the invention. In this embodiment, a PWM code whose logic is opposite to that of the code shown in FIG. 19 is used as the transmission code. The frame is started with the start bit, shown in FIG. 20, which is followed by a 4-bit priority code indicating the priority of frame, a 4-bit network ID code, and an 8-bit frame ID code. After the frame ID code is provided a 4-byte area consisting of a 2-byte "data valid/invalid field" and a 2-byte data area.

More specifically, the data valid/invalid field of the frame F, preceding the 16-bit (2-byte) data area, is a field of 16-bit codes corresponding respectively to the zeroth to fifteenth bits of the data area for indicating the validness/invalidness of the corresponding data bit. That is, the zeroth to fifteenth bits of the data area correspond to the zeroth to fifteenth bits of the data valid/invalid field, respectively. If the zeroth bit of the data valid/invalid field is "0," for example, the data corresponding to the zeroth bit of the data area is invalid. Similarly, if the first bit of the data valid/invalid field is "1", the data corresponding to the first bit of the data area is valid. If the data is valid, the reception multiplex node operates ordinarily based on the data; however, if the data is invalid, the reception node disregards the data whatever the content of the bit may be, that is, the node makes no decision based on it. By thus providing the data valid/invalid field, the content of the data in the data area need not be modified depending on the model and grade of vehicles, and can be applied to different system configurations by changing the codes of the necessary bits in the data valid/invalid field. Consequently, the number of frames need not be increased with an increase of the number of vehicle models and/or classes, so that the data area can be used effectively. Moreover, the frame can be standardized so as to be commonly used in all the vehicle models, whereby the load on development of multiplex transmission systems can be reduced.

A 1-byte error check code follows the data area. This error check code is used to check 56 bits in total from the priority code to the error code itself, by means of an 8-bit CRC whose generating function is $X^8 + X^2 + X + 1$, for example. The error check code is followed by an EOD, shown in FIG. 24(c), and a 3-byte ACK field for 24 nodes in which the reception of the frame is acknowledged. When no signal is detected within a period corresponding to at least 2 bits after the ACK field, any node can start transmitting data.

In the above, the multiplex transmission system of the present invention has been described with reference to several preferred embodiments in which the updating of the ACK table is carried out. Now, a further preferred embodiment of the present invention will be described. According to this embodiment, in retransmitting the frame, if a multiplex node registered in the ACK table continues to fail to return its ACK signal in repsonse to the frame re-transmission after the first transmission of the same frame, the frame re-transmission is repeated a predetermined number of times. The frame re-transmission is not effected for that multiplex node which returned its ACK signal at least once during the period from the first tranmission to the previous re-transmission of the same frame. In this example, it is assumed that the maximum number of connectible nodes is 16, for the sake of simplicity.

The embodiment will be explained with reference to the drawings. FIGS. 25(a)–25(f) shows the case where the front multiplex node FN and the rear multiplex node RN alternately return their ACK signals. In repsonse to the re-transmission (1) of the frame F8 (FIG. 25(c)) and the re-transmission (1) of the frame F9 (FIG. 25(e)), the rear multiplex node RN returns the ACK signal A4, but the front multiplex node FN fails to return its ACK signal A1. It is noted that the front multiplex node FN returned the ACK signal A1 at the time of the first transmission of the respective frames 8 and 9 (FIG.25(b) and 25(d), and therefore the frames are not re-transmitted to the node FN thereafter. Let it be assumed that, instead of this re-transmission system, the system is employed in which the ACK signals are collectively compared with the ACK table to discriminate the success/failure of signal transmission. When two or more multiplex nodes in the multiplex transmission system are mutually influenced by noises. For example, the re-transmission of frame will mostly be repeated the predetermined number of times if the nodes alternately return their ACK signals in response to the transmission of the same frame, as shown in FIGS. 26(a)–26(f), with the result that the transmission amount is increased.

In any of the above-described embodiments, each of the reception multiplex nodes determines whether or not the content of each of the received frames is accurate, by means of the error check code, and if no error is detected, it returns the ACK signal specific thereto to the transmission multiplex node in that bit area of the ACK field which corresponds to the address thereof. That is, each multiplex node delivers the ACK signal onto the multiplex transmission path even when it does not use the received data as the data has no relation thereto. Therefore, each of the multiplex nodes can detect the defectiveness of the other nodes by comparing ACK signals to be received in normal condition with the ACK signals actually received at the time of each frame transmission.

If for example, it is detected that no ACK signal is returned from a multiplex node a predetermined number of times on end, the node itself is judged to be defective, not due to the transmission error. The reason for using the normal ACK signals for the comparison is that the content of information in the ACK field is subject to variation, since some of the multiplex nodes may be optional in certain models and/or classes of vehicles. For example, vehicles of one model use 8 multiplex nodes, while those of another model use only 5 multiplex nodes.

The information of the ACK field in normal condition may be given for each of vehicle models, or the information of the ACK field obtained at a certain timing, for example, at the time all the multiplex nodes installed in the vehicle are powered for the first time (in this case, the positive logic sum of the ACK signals of a plurality of frames may be used), may be used as the information in normal condition. Alternatively, the information of the ACK table may be used as the information of the ACK signals in normal condition, such that the updating (deletion of bit) of the ACK table may indicate the defectiveness of the multiplex node corresponding to the deleted bit.

When a multiplex node is detected to be defective, an operation is performed to inform the vehicle driver of the defectiveness of the node by means of an alarm display or an alarm beep.

There may also be the case where the multiple transmission system is intermittently detected to be defective, for example, a node returns the ACK signal in response to a certain trouble discrimination message but delivers no ACK signal in response to another trouble discrimination message, or the node sometimes fails to return the ACK signal while the same trouble discrimination message is delivered a plurality of times, for the reason that the node is not completely broken but is defective due to disconnection of its connector, for example. To cope with such situation, the number of times the ACK signal is not returned may be counted, and when the integrated value exceeds a predetermined value within a predetermined period of time, the node concerned is judged to be defective and an alarm is issued. By doing this, the reliability of the multiplex transmission system can be further enhanced.

Figure 27:
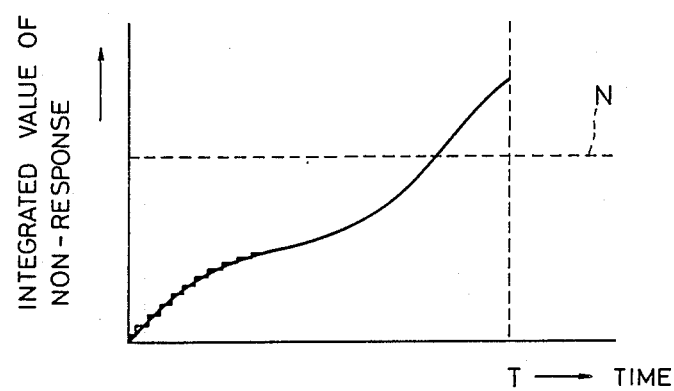
FIG. 27 is a graph showing, by way of example, a change in the integrated value of the number of non-return of the ACK signals with lapse of time.

More specifically, as shown in FIG. 27, the frequency of non-response is integrated for each of the multiplex nodes during a predetermined period of time T, e.g., 1 hour, and if the integrated value exceeds a predetermined value N, the multiplex node concerned is judged to be defective. Instead of obtaining the integrated value of the frequency of non-response during the predetermined period of time, the frequency of non-response relative to a predetermined number of data transmission may be integrated.

Figure 28:
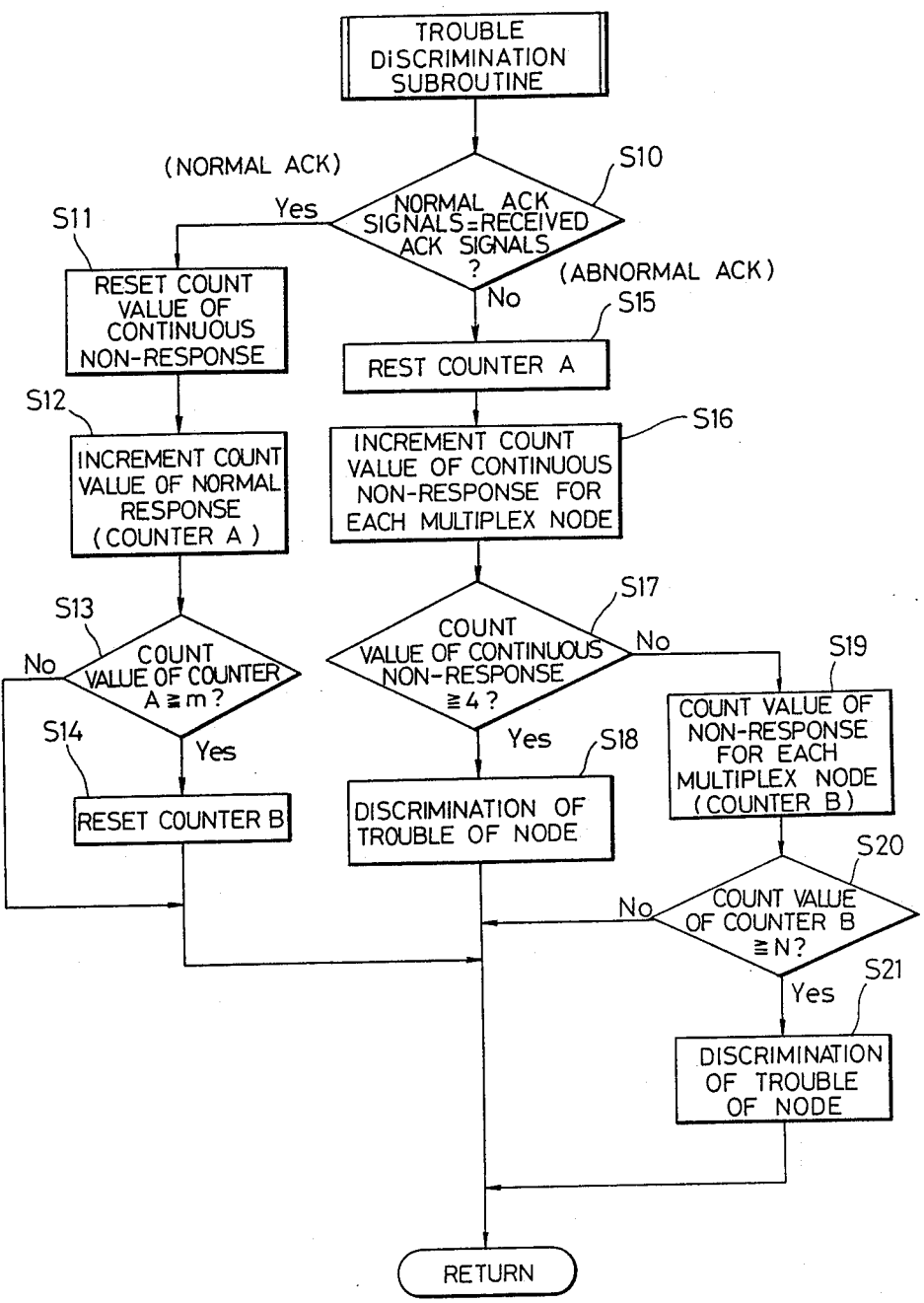
FIG. 28 is a flowchart illustrating a process for discriminating the trouble of each node, employed in the multiplex transmission system of the invention.

The integration of the frequency of non-response will be described with reference to the flowchart of FIG. 28. Each of the multiplex nodes compares the information of the normal ACK signals with the information carried by the received ACK signals of each frame, and determines whether the received ACK signals coincide with the normal ACK signals, in Step S10. If the received ACK signals coincide with the normal ACK signals, the count value of continuous non-response counted up to this time is reset, at Step S11. In Step S12, the count value of normal response, counted by a counter A, is incremented, and then in Step S13, a determination is made as to whether or not the normal ACK signals have been received m times consecutively. If the ACK signals have been received m times on end, the count value of a counter B is reset (Step S14), and the trouble discrimination is performed on the subsequent ACK signals. Also when the ACK signals have been received a number of times smaller than m, the discrimination of the subsequent ACK signals is performed, skipping Step S14. On the other hand, if it is determined in Step S10 that an abnormal ACK signal is received, the count value of the counter A is reset (Step S15), the number of continuous non-response is incremented for each of the multiplex nodes (Step S16). Then, in Step S17, it is determined for each multiplex node whether or not the number of times the node made no response on end is not smaller than a predetermined value, e.g., 4, and if the number is not smaller than 4, the multiplex node concerned is judged to be defective (Step S18). If the number of continuouos non-response is smaller than 4, the number of non-response is integrated digitally for each of the multiplex nodes, in Step S19. Then, in Step S20, it is determined whether the integrated value of non-response is not smaller than the predetermined value N. When the integrated value becomes greater than or equal to the predetermined value N, the multiplex node concerned is judged to be defective, in Step S21, while when the integrated value is smaller than the predetermined value N, the discrimination of the subsequent ACK signals is carried out.

What is claimed is:

1. A multiplex transmission method, in which one of plurality of nodes, as a transmission node, coupled together through a transmission path transmits data frame by frame to said transmission path, and all of said plurality of nodes, as reception nodes, each deliver a reception acknowledgement signal onto said transmission path upon proper reception of said frame of data, said multiplex transmission method comprising the steps of:
providing, said frame, a reception acknowledgment signal area including a plurality of divisions assigned to said plurality of nodes, respectively;
providing, in each of said plurality of nodes, a reception acknowledgment signal table consisting of information units each of which corresponds to a respective one of said plurality of divisions of said reception acknowledgment signal area;
causing each of the reception nodes which properly received said frame of data to return the reception acknowledgment signal specific thereto to that division in said reception acknowledgment signal area which corresponds to the respective node;
causing each of said plurality of nodes to discriminate the success/failure of signal tranmission by comparing the information in said reception acknowledgment signal area with the information registered beforehand in said reception acknowledgement signal table; and
causing said transmission node to re-transmit the frame of data and updating said reception acknowledgment signal tables of all of said plurality of nodes when the information registered in said reception acknowledgment signal table does not coincide with the information of said reception acknowledgment signal area.

2. The multiplex transmission system according to claim 1, wherein said plurality of nodes each compare, unit by unit, the information of said reception acknowledgment signal area with the information registered beforehand in said reception acknowledgment signal table, and update said reception acknowledgment signal table based on the result of said comparison.

3. The multiplex transmission system according to claim 1, wherein the information of said reception acknowledgment signal table is updated to the information in said reception acknowledgment signal area when the information in said reception acknowledgment signal area does not coincide with the information of said reception acknowledgment signal table continuously a predetermined number of times while the success/failure of signal transmission is discriminated frame by frame with respect to a plurality of frames transmitted continuously.

4. The multiplex transmission system according to claim 3, wherein the contents of said plurality of frames transmitted continuously are the same.

5. The multiplex transmission system according to claim 3, wherein when a node which is registered in said reception acknowledgment signal table fails to return the reception acknowledgment signal continuously a first predetermined number of times, each of said plurality of nodes deletes the registration of the information unit corresponding to said node which does not return the reception acknowledgment signal, from the reception acknowledgment signal table thereof; and when a node which is not registered in said reception acknowledgment signal table returns the reception acknowledgment signal a second predetermined number of times including 1, which is smaller than said first predetermined number of times, each of said plurality of nodes registers in the reception acknowledgment signal table thereof the information unit corresponding to said node which returned the reception acknowledgment signal.

6. The multiplex transmission system according to claim 1, wherein discrimination of the defectiveness of each of said plurality of nodes is effected based on updating and non-updating of the information in said reception acknowledgment signal table.

7. The multiplex transmission system according to claim 6, wherein discrimination of the defectiveness of each of said plurality of nodes is effected based on the integrated value of updating of said reception acknowledgment signal table representing the deletion and addition of the information in said reception acknowledgment signal table.

8. The multiplex transmission system according to claim 1, wherein a pulse width modulation code for discriminating a binary logic based on a size of a pulse width is used as a transmission code at least in said reception acknowledgment signal area.

9. The multiplex transmission system according to claim 1, wherein said frame transmitted includes a frame identification code having a value specific to each frame.

10. The multiplex transmission system according to claim 9, wherein said frame transmitted further includes a priority code indicating the priority of transmission of the frame to said transmission path, and a network identification code, both of which precede said frame identification code.

11. The multiplex transmission system according to claim 1, wherein said frame transmitted includes a data area for carrying data to be transmitted, and a data valid/invalid area having the same bit length as said data area and indicating the validness/invalidness of said data for respective bits of said data area.

12. A multiplex tranmission method, in which one of a plurality of nodes, as a transmission node, coupled together through a transmission path transmits data frame by frame to said transmission path, and all of said plurality of nodes, as reception nodes, each deliver a reception acknowledgement signal onto said transmission path upon proper reception of said frame of data, said multiplex transmission method comprising the steps of:
providing, in said frame, a reception acknowledgment signal area including a plurality of divisions assigned to said plurality of nodes, respectively;
providing, in each of said plurality of nodes, a reception acknowledgment signal table consisting of information units each of which corresponds to a respective one of said plurality of divisions of said reception acknowledgment signal area;
causing each of the reception nodes which properly received said frame of data to return the reception acknowledgment signal specific thereto to that division of said reception acknowledgment signal area which corresponds to the respective node; and causing said transmission node to compare, unit by unit, the information in said reception acknowledgment signal area with the information registered beforehand in said reception acknowledgment signal table, and to re-transmit said frame only when no reception acknowledgment signal has been returned to said reception acknowledgment signal area from a node that should return the reception acknowledgment signal, and to repeat re-transmission of the frame up to a predetermined number of times when the reception acknowledgment signal of said node did not appear even once in the reception acknowledgment signal areas in the transmitted and re-transmitted frames.

13. A multiplex transmission method in which one of a plurality of nodes, as a transmission node, coupled together through a transmission path transmits data frame by frame to said tranmission path, and all of said plurality of nodes, as reception nodes, each deliver a reception acknowledgement signal onto said transmission path upon proper reception of said frame of data, said multiplex transmission method comprising the steps of:

providing, in said frame, a reception acknowledgment signal area including a plurality of divisions assigned to said plurality of nodes, respectively;

causing each of the reception nodes which properly received said frame of data to return the reception acknowledgment signal specific thereto to that division of said reception acknowledgment signal area which corresponds to the respective node; and causing said transmission node, storing beforehand normal reception acknowledgment signals of said reception acknowledgment signal area, to compare the reception acknowledgment signals in said reception acknowledgment signal area returned in response to the transmission of each frame with the stored reception acknowledgment signals, so as to discriminate the defectiveness of each of said plurality of nodes based on the result of said comparison.

14. The multiplex transmission system according to claims 13, wherein said transmission node judges a node to be defective when said node fails to return the reception acknowledgment signal a predetermined number of times on end during a continuous transmission of frames.

15. The multiplex transmission system according to claim 13, wherein the number of times the reception acknowledgment signal is not returned to said transmission path is integrated for each of said plurality of nodes during frame transmission to said transmission path, and when the integrated value associated with a node reaches a predetermined value within a predetermined period, said node is judged to be defective.

* * * * *